US009477849B2

(12) United States Patent
Swink et al.

(10) Patent No.: US 9,477,849 B2
(45) Date of Patent: Oct. 25, 2016

(54) SYSTEMS, APPARATUS, METHODS AND COMPUTER-READABLE STORAGE MEDIA FOR FACILITATING MANAGEMENT OF SOCIAL MEDIA INFORMATION FOR COMMUNICATION DEVICES

(75) Inventors: Cristy Swink, Milton, GA (US); Jason Sikes, Carnation, WA (US); Benjamin Fineman, San Francisco, CA (US); Christopher Marshall Turitzin, San Francisco, CA (US); Alex Tam, San Francisco, CA (US); Hannah Regier, Berkeley, CA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 330 days.

(21) Appl. No.: 12/903,618

(22) Filed: Oct. 13, 2010

(65) Prior Publication Data
US 2011/0087705 A1 Apr. 14, 2011

Related U.S. Application Data

(60) Provisional application No. 61/251,717, filed on Oct. 14, 2009, provisional application No. 12/643,726, filed on Dec. 21, 2009.

(51) Int. Cl.
*G06F 17/30* (2006.01)
*G06F 21/84* (2013.01)
(Continued)

(52) U.S. Cl.
CPC ............. *G06F 21/84* (2013.01); *G06F 21/575* (2013.01); *H04L 51/16* (2013.01); *H04L 51/32* (2013.01); *H04M 1/7255* (2013.01); *H04M 1/72552* (2013.01); *H04M 1/72555* (2013.01);
(Continued)

(58) Field of Classification Search
CPC ............. G06F 17/30864; G06F 21/31; G06F 21/6245; G06F 21/30; G06F 21/62; G06F 3/0481; G06F 17/30554
See application file for complete search history.

(56) References Cited

U.S. PATENT DOCUMENTS 5,072,412 A 12/1991 Henderson, Jr. et al.
5,233,687 A 8/1993 Henderson, Jr. et al.
(Continued)

FOREIGN PATENT DOCUMENTS

WO 2008107675 9/2008

OTHER PUBLICATIONS

"Brad's Life: AddressBooker & exporting my Facebook Phonebook" http://brad.livejournal.com/2398409.html as archived on archive.org on Dec. 5, 2008.*
(Continued)

*Primary Examiner* — Angelica Ruiz
(74) *Attorney, Agent, or Firm* — Amin, Turocy & Watson, LLP

(57) ABSTRACT

Systems, apparatus, methods and computer-readable storage media facilitating management of social media (SM) information are provided. In some embodiments, a method can include: executing a batch linking application; and batch linking one or more social network (SN) contacts to one or more contacts stored on or accessible by the communication device, wherein the batch linking comprises obtaining the one or more SN contacts at the communication device, wherein the one or more SN contacts are selected for the batch linking based, at least, on a correspondence to the one or more contacts, and wherein the batch linking is performed by the communication device.

20 Claims, 20 Drawing Sheets

(51) Int. Cl.
*G06F 21/57* (2013.01)
*H04L 12/58* (2006.01)
*H04M 1/725* (2006.01)
*H04W 4/12* (2009.01)
*H04W 4/14* (2009.01)

(52) U.S. Cl.
CPC .......... *H04W4/12* (2013.01); *H04W 4/14* (2013.01); *G06F 2221/031* (2013.01); *G06F 2221/2113* (2013.01); *G06F 2221/2141* (2013.01); *H04L 51/28* (2013.01)

(56) References Cited

U.S. PATENT DOCUMENTS

| | | |
|---|---|---|
| 5,394,521 A | 2/1995 | Henderson, Jr. et al. |
| 5,838,326 A | 11/1998 | Card et al. |
| 5,847,709 A | 12/1998 | Card et al. |
| 6,269,369 B1* | 7/2001 | Robertson |
| 6,367,020 B1 | 4/2002 | Klein |
| 6,401,209 B1 | 6/2002 | Klein |
| 7,269,727 B1 | 9/2007 | Mukherjee et al. |
| 7,286,063 B2 | 10/2007 | Gauthey et al. |
| 7,308,926 B1 | 12/2007 | Hawkins |
| 7,322,626 B2 | 1/2008 | Thomas |
| 7,324,333 B2 | 1/2008 | Allen |
| 7,376,669 B2 | 5/2008 | Klein |
| 7,443,665 B2 | 10/2008 | Allen |
| 7,453,443 B2 | 11/2008 | Rytivaara et al. |
| 7,478,436 B1 | 1/2009 | Sheih et al. |
| 7,606,024 B2 | 10/2009 | Boss et al. |
| 7,620,982 B2 | 11/2009 | Ishidera |
| 7,628,335 B2 | 12/2009 | Morimoto et al. |
| 7,636,033 B2 | 12/2009 | Golden |
| 7,640,293 B2 | 12/2009 | Wilson et al. |
| 7,761,814 B2 | 7/2010 | Rimas-Ribikauskas et al. |
| 7,933,609 B2 | 4/2011 | Lagerstedt et al. |
| 7,953,859 B1 | 5/2011 | Kiefhaber et al. |
| 8,108,781 B2 | 1/2012 | Laansoo et al. |
| 8,318,095 B2 | 11/2012 | Wheeler et al. |
| 2001/0044903 A1 | 11/2001 | Yamamoto et al. |
| 2002/0056046 A1 | 5/2002 | Klein |
| 2002/0077079 A1 | 6/2002 | Ishihara |
| 2002/0099960 A1 | 7/2002 | Klein |
| 2002/0114654 A1 | 8/2002 | Abe et al. |
| 2003/0023688 A1 | 1/2003 | Denenberg et al. |
| 2003/0025840 A1 | 2/2003 | Arling |
| 2003/0074575 A1 | 4/2003 | Hoberock et al. |
| 2003/0074590 A1 | 4/2003 | Fogle et al. |
| 2003/0120957 A1 | 6/2003 | Pathiyal |
| 2003/0172495 A1 | 9/2003 | Pan |
| 2003/0184592 A1 | 10/2003 | Awada et al. |
| 2003/0191960 A1 | 10/2003 | Hung-yi |
| 2003/0206224 A1 | 11/2003 | Sakakibara et al. |
| 2004/0034561 A1 | 2/2004 | Smith |
| 2004/0046018 A1 | 3/2004 | Dobbins |
| 2004/0082322 A1 | 4/2004 | Tani |
| 2004/0085351 A1 | 5/2004 | Tokkonen |
| 2004/0092247 A1 | 5/2004 | Tani |
| 2004/0113491 A1 | 6/2004 | Mauser |
| 2004/0113819 A1 | 6/2004 | Gauthey |
| 2004/0123135 A1 | 6/2004 | Goddard |
| 2004/0137884 A1 | 7/2004 | Engstrom et al. |
| 2004/0189439 A1 | 9/2004 | Cansino |
| 2004/0220913 A1 | 11/2004 | Walker |
| 2005/0085215 A1 | 4/2005 | Kokko et al. |
| 2005/0117564 A1 | 6/2005 | Vieri et al. |
| 2005/0234910 A1 | 10/2005 | Buchheit et al. |
| 2005/0253817 A1 | 11/2005 | Rytivaara et al. |
| 2005/0282135 A1 | 12/2005 | Berman |
| 2006/0012577 A1 | 1/2006 | Kyrola |
| 2006/0052091 A1* | 3/2006 | Onyon .............. H04L 29/12047 455/415 |
| 2006/0075250 A1 | 4/2006 | Liao |
| 2006/0101350 A1 | 5/2006 | Scott |
| 2006/0176661 A1 | 8/2006 | Allen |
| 2006/0184351 A1 | 8/2006 | Corston-Oliver et al. |
| 2006/0195474 A1* | 8/2006 | Cadiz et al. .............. 707/104.1 |
| 2006/0253371 A1 | 11/2006 | Rutt et al. |
| 2006/0255907 A1 | 11/2006 | Min |
| 2006/0271526 A1 | 11/2006 | Charnock et al. |
| 2006/0291157 A1 | 12/2006 | Allen |
| 2006/0291158 A1 | 12/2006 | Allen |
| 2007/0085839 A1 | 4/2007 | Yang et al. |
| 2007/0088687 A1 | 4/2007 | Bromm et al. |
| 2007/0119952 A1 | 5/2007 | Morimoto et al. |
| 2007/0133771 A1 | 6/2007 | Stifelman et al. |
| 2007/0133802 A1 | 6/2007 | Yuan |
| 2007/0135091 A1 | 6/2007 | Wassingbo |
| 2007/0144225 A1 | 6/2007 | Tamura |
| 2007/0150842 A1 | 6/2007 | Chaudhri et al. |
| 2007/0161410 A1 | 7/2007 | Huang et al. |
| 2007/0203982 A1 | 8/2007 | Jagoe et al. |
| 2007/0204064 A1 | 8/2007 | Mail et al. |
| 2007/0220542 A1 | 9/2007 | Kim |
| 2007/0247276 A1 | 10/2007 | Murchison et al. |
| 2007/0274300 A1 | 11/2007 | Chu et al. |
| 2007/0282839 A1 | 12/2007 | Walker |
| 2008/0036743 A1 | 2/2008 | Westerman et al. |
| 2008/0036747 A1 | 2/2008 | Hope |
| 2008/0049135 A1 | 2/2008 | Okudaira |
| 2008/0055269 A1 | 3/2008 | Lemay et al. |
| 2008/0055276 A1 | 3/2008 | Chang |
| 2008/0059880 A1 | 3/2008 | Cato et al. |
| 2008/0064370 A1 | 3/2008 | Fukaya et al. |
| 2008/0082421 A1* | 4/2008 | Onyon .............. G06Q 30/02 705/14.19 |
| 2008/0089587 A1 | 4/2008 | Kim et al. |
| 2008/0122796 A1 | 5/2008 | Jobs et al. |
| 2008/0153459 A1 | 6/2008 | Kansal et al. |
| 2008/0189122 A1 | 8/2008 | Coletrane et al. |
| 2008/0189623 A1 | 8/2008 | Patil et al. |
| 2008/0207166 A1 | 8/2008 | Aerrabotu et al. |
| 2008/0222636 A1 | 9/2008 | Wang et al. |
| 2008/0229397 A1 | 9/2008 | Basner et al. |
| 2008/0281610 A1 | 11/2008 | Yoshida et al. |
| 2009/0006991 A1 | 1/2009 | Lindberg et al. |
| 2009/0034804 A1 | 2/2009 | Cho et al. |
| 2009/0040018 A1 | 2/2009 | Lee et al. |
| 2009/0044578 A1 | 2/2009 | Boss et al. |
| 2009/0061823 A1 | 3/2009 | Chu |
| 2009/0064055 A1 | 3/2009 | Chaudhri et al. |
| 2009/0066489 A1 | 3/2009 | Golden |
| 2009/0102803 A1 | 4/2009 | Newman et al. |
| 2009/0104925 A1 | 4/2009 | Aula |
| 2009/0128335 A1 | 5/2009 | Leung |
| 2009/0138562 A1 | 5/2009 | Schmulen et al. |
| 2009/0157732 A1* | 6/2009 | Hao et al. ..................... 707/102 |
| 2009/0167717 A1 | 7/2009 | Wang et al. |
| 2009/0170553 A1 | 7/2009 | Wang et al. |
| 2009/0177981 A1 | 7/2009 | Christie et al. |
| 2009/0187676 A1 | 7/2009 | Griffin et al. |
| 2009/0215479 A1 | 8/2009 | Karmarkar et al. |
| 2009/0217211 A1 | 8/2009 | Hildreth et al. |
| 2009/0222748 A1 | 9/2009 | Lejeune et al. |
| 2009/0234935 A1 | 9/2009 | Watson et al. |
| 2009/0245484 A1 | 10/2009 | Bates |
| 2009/0259968 A1 | 10/2009 | Hsieh et al. |
| 2009/0264117 A1 | 10/2009 | Hsieh et al. |
| 2009/0264157 A1 | 10/2009 | Hsieh et al. |
| 2009/0265666 A1 | 10/2009 | Hsieh et al. |
| 2009/0288032 A1 | 11/2009 | Chang et al. |
| 2009/0296913 A1 | 12/2009 | Thomas et al. |
| 2009/0327263 A1 | 12/2009 | Maghoul et al. |
| 2010/0009727 A1 | 1/2010 | Presutti |
| 2010/0071423 A1 | 3/2010 | Dehaan et al. |
| 2010/0079380 A1 | 4/2010 | Nurmi |
| 2010/0082684 A1 | 4/2010 | Churchill et al. |
| 2010/0094939 A1 | 4/2010 | Cheng et al. |
| 2010/0105440 A1 | 4/2010 | Kruzeniski et al. |
| 2010/0123724 A1 | 5/2010 | Moore et al. |
| 2010/0127998 A1 | 5/2010 | Hyun |
| 2010/0145951 A1 | 6/2010 | Van Coeverden De Groot et al. |
| 2010/0156594 A1 | 6/2010 | Chaikin et al. |
| 2010/0159995 A1 | 6/2010 | Stallings et al. |

(56) References Cited

U.S. PATENT DOCUMENTS

| | | |
|---|---|---|
| 2010/0162133 A1 | 6/2010 | Pascal et al. |
| 2010/0164740 A1 | 7/2010 | Lo et al. |
| 2010/0199359 A1 | 8/2010 | Miki |
| 2010/0207723 A1 | 8/2010 | Cao et al. |
| 2010/0214237 A1 | 8/2010 | Echeverri et al. |
| 2010/0223097 A1 | 9/2010 | Kramer et al. |
| 2010/0235733 A1 | 9/2010 | Drislane et al. |
| 2010/0251116 A1 | 9/2010 | Rimas-Ribikauskas et al. |
| 2010/0257490 A1 | 10/2010 | Lyon et al. |
| 2010/0309149 A1 | 12/2010 | Blumenberg et al. |
| 2010/0325155 A1 | 12/2010 | Skinner et al. |
| 2011/0035673 A1 | 2/2011 | Chou et al. |
| 2011/0035708 A1 | 2/2011 | Damale |
| 2011/0062143 A1 | 3/2011 | Satanek et al. |
| 2011/0081922 A1 | 4/2011 | Chandra et al. |
| 2011/0169909 A1 | 7/2011 | Gu |
| 2011/0179387 A1 | 7/2011 | Shaffer et al. |
| 2012/0319985 A1 | 12/2012 | Moore et al. |
| 2013/0205243 A1 | 8/2013 | Rivera et al. |
| 2014/0082557 A1 | 3/2014 | Warner |
| 2014/0258897 A1 | 9/2014 | Shiplacoff et al. |
| 2015/0193132 A1 | 7/2015 | Fagans |

OTHER PUBLICATIONS

"Sprint Palm Pre Phone User Guide" As shipped with the Palm Pre (Jun. 2009).*

"Information Revelation and Privacy in Online Social Networks" Ralph Gross & Alessandro Acquisti (2005).*

OA dated Nov. 14, 2011 for U.S. Appl. No. 12/643,726 , 59 pages.

Spagnuolo-Tweetdeck, http://edgehopper.com/how-to-use-tweetdeck-the-ultimate-twitter-client/,Feb. 12, 2009, 11 pages.

"Global Framework—UE Flows and Screen Details". AT&T Armstrong Project. Version 1.10. Last accessed Jun. 16, 2010, 166 pages.

"Global Framework—VD Specification". AT&T Armstrong project. Version 1.11. Last accessed Jun. 16, 2010, 117 pages.

"Phone Top—UE Flows and Screen Details". AT&T Armstrong Project. Version 1.18. Last accessed Jun. 16, 2010, 104 pages.

"Phone Top—VD Specification". AT&T Armstrong Project. Version 1.12. Last accessed Jun. 16, 2010, 52 pages.

"Phone / Dailer—UE Flows and Screen Details". AT&T Armstrong Project. Version 1.8. Last accessed Jun. 16, 2010, 57 pages.

"Dialer—VD Specification". AT&T Armstrong Project. Version 1.7. Last accessed Jun. 16, 2010, 19 pages.

"Contacts—UE Flows and Screen Details". AT&T Armstrong Project. Version 2.6. Last accessed Jun. 16, 2010, 142 pages.

"Contact—VD Specification". AT&T Armstrong Project. Version 2.2. Last accessed Jun. 16, 2010. 48 pages.

"Third-Party Pickers—UE Flows and Screen Details". AT&T Armstrong Project. Version 1.1. Last accessed Jun. 16, 2010, 23 pages.

"3rd Party Pickers". AT&T C@lumbus Project. Version 1.1. Last accessed Jun. 16, 2010, 7 pages.

"Social—UE Flows and Screen Details". AT&T C@lumbus Project. Version 1.5. Last accessed Jun. 16, 2010, 107 pages.

"Social—VD Specification". AT&T C@lumbus Project. Version 1.5. Last accessed Jun. 16, 2010, 39 pages.

"Media App—UE Flows and Screen Details". AT&T Armstrong Project. Version 1.6. Last accessed Jun. 16, 2010, 118 pages.

"Media—VD Specification". AT&T Armstrong Project. Version 1.3. Last accessed Jun. 16, 2010, 29 pages.

"Mobile Share—Reduced Scope; UE Flows and Screen Details". AT&T Armstrong Project. Version 1.2 RS. Last accessed Jun. 16, 2010, 59 pages.

"Mobile Share (Reduced Scope)". AT&T Armstrong Project. Version 1.2RS. Last accessed Jun. 16, 2010, 15 pages.

"Camera App—UE Flows and Screen Details". AT&T Armstrong Project. Version 1.8. Last accessed Jun. 16, 2010, 77 pages.

"Camera—VD Specification". AT&T Project. Version 1.8. Last accessed Jun. 16, 2010, 22 pages.

"Alarm Clock—UE Flows and Screen Details". AT&T Armstrong Project. Version 1.4. Last accessed Jun. 16, 2010, 35 pages.

"Alarm Clock—VD Specification". AT&T Armstrong Project. Version 1.4. Last accessed Jun. 16, 2010, 18 pages.

"Settings—UE Flows and Screen Details". AT&T Armstrong Project. Version 1.18. Last accessed Jun. 16, 2010, 180 pages.

"Settings—VD Specification". AT&T Armstrong Project. Version 1.8. Last accessed Jun. 16, 2010, 40 pages.

"Conversations—UE Flows and Screen Details". AT&T Armstrong Project. Version 1.3. Last accessed Jun. 16, 2010, 148 pages.

"Conversations". AT&T Armstrong Project. Version 1.5. Last accessed Jun. 16, 2010, 54 pages.

"Firmware Over the Air Updates—UE Flows and Screen Details". AT&T Armstrong Project. Version 1.9. Last accessed Jun. 16, 2010, 39 pages.

Paul McDougall. Browser. AT&T Armstrong Project. Version 1.3. Last accessed Jun. 16, 2010, 6 pages.

Paul McDougall. Maps. AT&T Armstrong Project. Version 1.3. Last accessed Jun. 16, 2010, 8 pages.

"Reference Guide". AT&T Armstrong Project. Version 1.0, Last accessed Jun. 16, 2010, 4 pages.

D. Austin Henderson, Jr. Rooms: the use of multiple virtual workspaces to reduce space contention in a window-based graphical user interface. ACM Transactions on Graphics. http://portal.acm.org/citation.cfm?id=24056&coll=portal&dl=ACM&CFID=23778768&CFTOKEN =77139655.

http://www.siliconvalleywatcher.com/mt/archives/2010/04/panama_kill_voi.php.

http://www.google.com/support/forum/p/voice/thread?tid=64d1c9d5fb45cccf&hl=en.

Bob Tedeschi, Group Texting Grows Up, With Features That Appeal to Adults. http://www.nytimes.com/2010/10/21/technology/personaltech/21smart.html. Last accessed Nov. 1, 2010, 3 pages.

A Teenager's Dream: An iPhone App for Free Texting—Bits Blog—NYTimes.com. http://bits.blogs.nytimes.com/2009/08/25/a-teens-dream-an-iphone-app-for-tree-texting. Last accessed Oct. 13, 2009, 19 pages.

Build and grow with Facebook Connect. http://developers.facebook.com/connect.php?tab=website. Last accessed Nov. 2, 2009, 2 pages.

Build and grow with Facebook Connect. http://developers.facebook.com/connect.php?tab=iphone. Last acceseed Nov. 2, 2009, 1 pages.

http://www.sprint.com/cdma/assets/pdfs/phone_guides/palm/palm_pre_p100_ug.pdf at pp. 44, 57-58. Last accessed Nov. 6, 2009, 3 pages.

MTN—Meeting the needs of the South African market for a new mobile messaging solution—Mobile IM. http://www.moviuscorp.com/files/case_study_mtn.pdf. Last accessed Nov. 2, 2009, 5 pages.

http://www.bizzia.com/buzznetworker/social-web-aggregation. Last accessed Nov. 6, 2009, 4 pages.

Alexander The Late. http://alexanderthelate.wordpress.com/2008/02/11/social-media-aggregation-lifestreaming-all-of-your-web-activity-in-one-simple-and-potentially-inconvenient-place/. Last accessed Nov. 3, 2009, 3 pages.

Schroeder, 20 Ways to Aggregate Your Social Networking Profiles, http://mashable.com/2007/07/17/social-network-aggregators/, Jul. 17, 2007, 20 pages.

Hirsch, iPhone 2.0 Apps: The Social Networking App Comparison, http://mashable.com/2008/07/17/iphone-social-networking-app-comparison/, Jul. 17, 2008, 9 pages.

Lifestream: Bebo's new social media aggregation tool | Media | guardian.co.uk, http://www.guardian.co.uk/media/pda/2009/feb/23/socialnetworking-bebo, Last Accessed Nov. 6, 2009, 3 pages.

Wikipedia, Social network aggregation—Widipedia, the free encyclopedia, http://en.wikipedia.org/wiki/Social_Network_Aggregation, Last Accessed Nov. 6, 2009, 3 pages.

Jaiku | Your Conversation, www.jaiku.com, Last accessed Nov. 6, 2009, 3 pages.

(56) References Cited

OTHER PUBLICATIONS

StumbleUpon.com: Personalized Recommendations to Help You Discover the Best of the . . . , www.stumbleupon.com, Last accessed Nov. 6, 2009, 2 pages.
The Walt Disney Internet Group, www.dig.com, Last accessed Nov. 6, 2009, 1 page.
Delicioussocial bookmarking, www.del.icio.us, Last accessed Nov. 6, 2009, 6 pages.
Google Wave—Wikipedia, the free encyclopedia, http://en.wikipedia.org/wiki/Google_wave, Last accessed Dec. 18, 2009, 5 pages.
Motorola Backflip (TM )—Wireless from AT&T, http://www.wireless.att.com/cell-phone-service/cell-phone-sales/promotion/motobackflip.jsp, Last Accessed Mar. 29, 2010, 2 pages.
MOTOBLUR—Motorola USA, http://www.motorola.com/Consumers/US-EN/Consumer-Product-and-Services/MOTOBOL . . . , Last accessed Mar. 29, 2010, 3 pages.
OA dated Feb. 11, 2013 for U.S. Appl. No. 12/902,979, 53 pages.
OA dated Jan. 30, 2013 for U.S. Appl. No. 12/903,632, 28 pages.
OA dated Dec. 20, 2012 for U.S. Appl. No. 12/903,679, 40 pages.
OA dated Mar. 13, 2013 for U.S. Appl. No. 12/643,726, 55 pages.
OA dated Jun. 13, 2013 for U.S. Appl. No. 12/903,382, 53 pages.
OA dated May 14, 2013 for U.S. Appl. No. 12/903,414, 62 pages.
OA dated Aug. 1, 2012 for U.S. Appl. No. 12/903,632, 47 pages.
OA dated Sep. 7, 2012 for U.S. Appl. No. 12/902,979, 63 pages.
OA dated Apr. 6, 2012 for U.S. Appl. No. 12/643,726, 43 pages.
Office Action dated Aug. 23, 2013 for U.S. Appl. No. 12/643,726, 61 pages.
Office Action dated Nov. 1, 2013 for U.S. Appl. No. 12/903,382, 30 pages.
Office Action dated Oct. 11, 2013 for U.S. Appl. No. 12/903,679, 22 pages.
Office Action for U.S. Appl. No. 12/903,679 dated Jan. 31, 2014, 17 pages.
Office Action dated Sep. 23, 2014 for U.S. Appl. No. 12/903,382, 32 pages.
Office Action dated Sep. 30, 2014 for U.S. Appl. No. 12/643,726, 63 pages.
Office Action dated Jan. 28, 2015 for U.S. Appl. No. 12/903,382, 57 Pages.
Office Action dated Sep. 14, 2015 for U.S. Appl. No. 12/643,726, 73 Pages.
Non-Final Office Action dated Dec. 2, 2015 for U.S. Appl. No. 12/903,632, 72 pages.
Office Action dated Apr. 14, 2016 for U.S. Appl. No. 14/543,872, 92 pages.
Office Action dated Jun. 14, 2016 for U.S. Appl. No. 12/903,632, 31 pages.

\* cited by examiner

SYSTEMS, APPARATUS, METHODS AND COMPUTER-READABLE STORAGE MEDIA FOR FACILITATING MANAGEMENT OF SOCIAL MEDIA INFORMATION FOR COMMUNICATION DEVICES

CROSS-REFERENCES TO RELATED APPLICATIONS

This application claims priority to and the benefit of U.S. Provisional Application No. 61/251,717, filed Oct. 14, 2009, and titled "SYSTEMS, METHODS AND APPARATUS FOR NEXT-GENERATION MOBILE MESSAGING," U.S. Non-Provisional patent application Ser. No. 12/643,726, filed Dec. 21, 2009, titled "SYSTEMS, APPARATUS, METHODS AND COMPUTER-READABLE STORAGE MEDIA FOR FACILITATING INTEGRATED MESSAGING, CONTACTS AND SOCIAL MEDIA FOR A SELECTED ENTITY," the entire contents of which are incorporated herein by reference.

BACKGROUND

With advancements in technology, the amount and type of information that users can access over wireless networks is growing rapidly. Similarly, mobile devices are becoming ubiquitous due to convenience of use resultant from their lightweight nature, and users are demanding that a plethora of different types of information be provided to the devices. Additionally, the ability to form online social networks (SNs) with others has increased the possibilities for casual, business and family networking. The popularity of such SNs, and the social networking sites (SNSs) that facilitate such SNs, has caused users of such sites, and the social media (SM) information provided to and retrievable from such sites, to be immense. To fully reap the benefits of the SNs, many users access contacts, status updates, wall postings and/or photo albums of friends via their communication devices. Ever present challenges for users of communication devices are efficiently retrieving select SM information from SNSs, and/or managing the relationships with other users of SNSs with which the owner of the communication device is affiliated. Accordingly, systems, apparatus, methods and computer-readable storage media for facilitating management of SM information for communication devices is desirable.

SUMMARY

The following presents a simplified summary in order to provide a basic understanding of various aspects described herein. The summary is not an extensive overview, and is not intended to identify key or critical elements or to delineate the scopes thereof. The sole purpose of the summary is to present selected concepts in a simplified form as a prelude to the more detailed description that is presented below.

The aspects described herein are systems, apparatus, methods and computer-readable storage media for facilitating management of SM information for communication devices.

In one aspect, a computer-implemented method is provided. The computer-implemented method can include: executing a batch linking application; and batch linking one or more SN contacts to one or more contacts stored on or accessible by the communication device, wherein batch linking comprises obtaining the one or more SN contacts at the communication device, wherein the one or more SN contacts are selected for the batch linking based, at least, on a correspondence to the one or more contacts, and wherein the batch linking is performed by the communication device.

In another aspect, a computer-implemented method is provided. The computer-implemented method can include: identifying a plurality of SN contacts having a friend status; identifying a plurality of linked contacts stored on or accessible by the communication device; and unlinking ones of the plurality of linked contacts that are not included in the plurality of SN contacts having a friend status, wherein the unlinking is performed by the communication device.

In another aspect, an apparatus is provided. The apparatus can include: a processor; a SM management component configured to: select one or more SN contacts for batch linking; and batch link one or more SN contacts to one or more contacts stored on or accessible by the communication device, wherein batch linking comprises obtaining the one or more SN contacts at the communication device, wherein the one or more SN contacts are selected for the batch linking based, at least, on a correspondence to the one or more contacts, and wherein the batch linking is performed by the communication device. The apparatus can also include a computer-readable storage medium storing computer-executable instructions that, if executed, cause the apparatus to perform one or more functions of the SM management component.

BRIEF DESCRIPTION OF THE DRAWINGS

Non-limiting and non-exhaustive embodiments of various aspects detailed herein are described with reference to the following figures, wherein like reference numerals refer to like parts.

DETAILED DESCRIPTION

Figure 1:
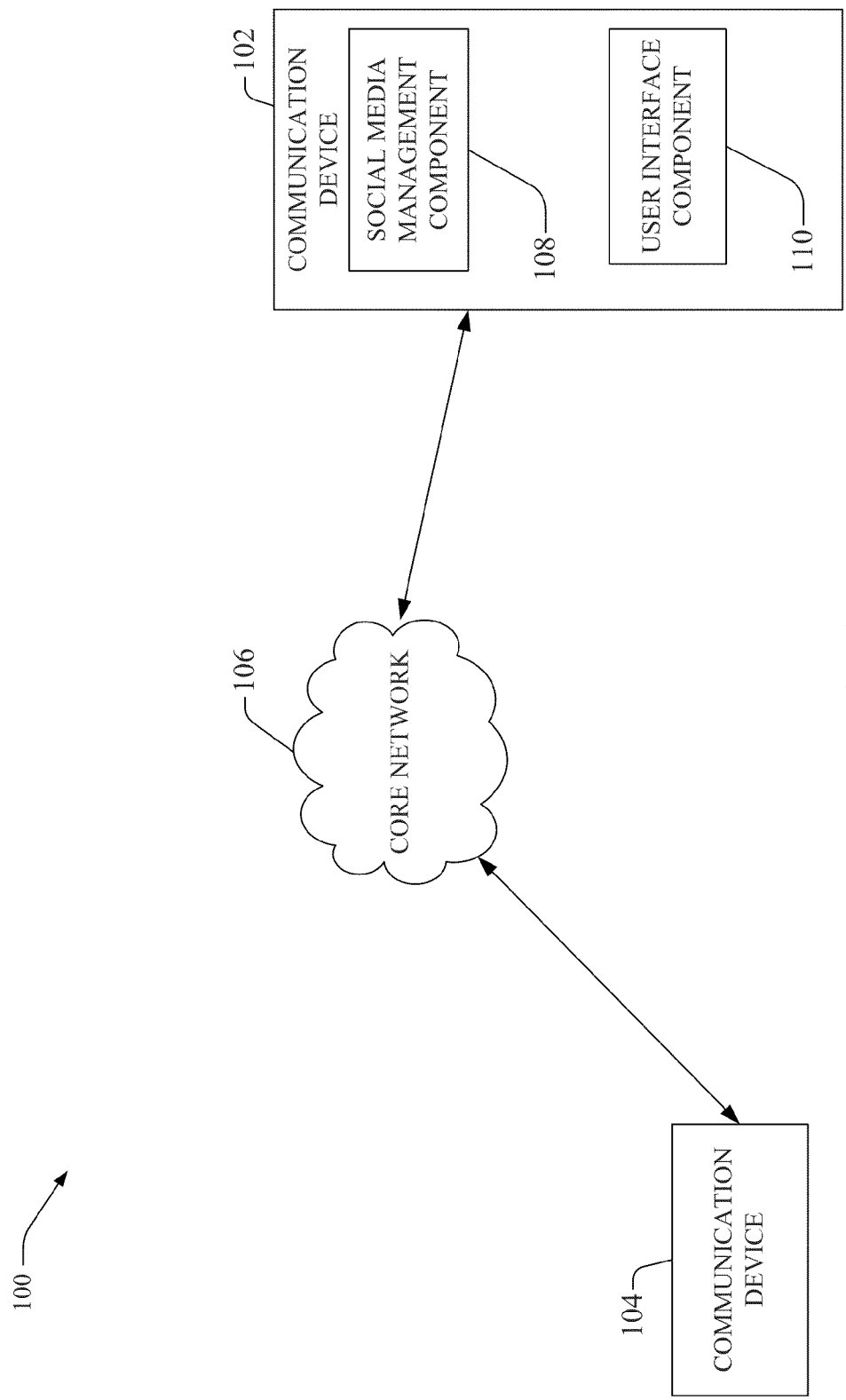
FIG. 1 illustrates a block diagram of an exemplary system that facilitates management of SM information for communication devices in accordance with various aspects and embodiments described herein.

Certain illustrative embodiments are described herein in the following description and the annexed drawings. These embodiments are merely exemplary, non-limiting and non-exhaustive. As such, all modifications, alterations, and variations within the spirit of the embodiments is envisaged and intended to be covered herein.

Further, in the following description, for purposes of mere explanation, numerous, specific details are set forth in order to facilitate a more thorough understanding of the embodiments described herein, including the claimed subject matter. However, as is known to those of ordinary skill in the art, the embodiments can be practiced, in many instances, without inclusion of the specific details.

As used in this application, the terms "component," "module," "system," "interface," and the like, are generally intended to refer to hardware and/or software or software in execution. For example, a component can be, but is not limited to being, a process running on a processor, a processor, an object, an executable, a thread of execution, a program and/or a computer. By way of illustration, both an application running on a controller and the controller can be a component. One or more components can reside within a process and/or thread of execution and a component can be localized on one computer and/or distributed between two or more computers. As another example, an interface can include input/output (I/O) components as well as associated processor, application and/or application programming interface (API) components, and can be as simple as a command line or as complex as an Integrated Development Environment (IDE).

Furthermore, the embodiments can be implemented as a method, apparatus or article of manufacture using standard programming and/or engineering techniques to produce software, firmware, hardware, or any combination thereof to control a computer, apparatus or article of manufacture to implement the functionality disclosed herein. The term "article of manufacture," as used herein, is intended to encompass a computer program, or computer program product, accessible from any computer-readable device, computer-readable carrier, computer-readable media or computer-readable storage media. Computer-readable storage media can include, but are not limited to, magnetic storage devices (e.g., hard disk, floppy disk, magnetic strip), optical disks (e.g., compact disk (CD), digital versatile disk (DVD)), smart cards, and/or flash memory devices (e.g., card, stick, key drive). Additionally it should be appreciated that a carrier wave can carry computer-readable electronic data (e.g., the data transmitted and received via email and/or to access the Internet or a network such as a local area network (LAN)). As known to those of ordinary skill in the art, modifications can be made to the above embodiments without departing from the spirit of the disclosure.

It will be appreciated by one of skill in the art that a communication network for systems described herein can include any suitable mobile- and/or wireline-based circuit-switched communication network including a global systems for mobile communication (GSM) network, a time division multiple access (TDMA) network, a code division multiple access (CDMA) network, such as IS-95 and subsequent iterations of CDMA technology, an integrated digital enhanced network (iDEN) network and a public switched telephone network (PSTN). Further examples of a communication network can include any suitable data packet-switched or combination data packet/circuit-switched communication network, wired or wireless internet protocol (IP) network such as a voice over internet protocol (VoIP) network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a communication device for systems disclosed herein can include a mobile device, mobile phone, a PSTN phone, a cellular communication device, a cellular phone, a satellite communication device, a satellite phone, a VoIP phone, a wireless fidelity (WiFi) phone, a dual-mode cellular/WiFi phone, a combination cellular/VoIP/WiFi/Worldwide Interoperability for Microwave Access (WiMAX) phone or any suitable combination thereof. Specific examples of a mobile device can include, but is not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones UMTS VoIP phones, or like devices or combinations thereof. To provide support for a mobile device, a gateway routing component can include any suitable component that can perform centralized routing within a mobile, satellite, or similar network (but optionally need not include components that route strictly within a PSTN network), routing between communication networks, between networks of varying architecture (e.g., between PSTN, GSM, Universal Mobile Telecommunications System (UMTS), Enterprise VoIP, the Internet, or combinations thereof), and the like. Specific examples of a gateway routing component can include, but are not limited to, a gateway mobile switching center (GMSC), a gateway general packet radio service (GPRS) support node (GGSN), a session border control (SBC) device, or like devices. Additionally, a data storage component of such a system can include any suitable device, process and/or combination device and process that can store digital and/or switched information (e.g., server, database, data store, or the like).

As used herein, the term "link" can be, in some embodiments, an association between a profile or information for the contact and a profile or information for a SN contact in a SN; and/or an association between the contact and the SN contact. As used herein, the term "feed item" can be, in some embodiments, an item in or associated with a SNS feed. In some embodiments, a user can be signed-in to a SNS when a token for the SNS session is active and signed-out when the token for the SNS has expired or the session has been ended by the user. The cache can be cleared for signed-out SNSs, in some embodiments.

FIG. 1 illustrates a block diagram of an exemplary system that facilitates management of SM information for communication devices in accordance with various aspects and embodiments described herein. The system 100 can include communication devices 102, 104 and a core network 106. The communication devices 102, 104 can be communicatively coupled to the core network 106. In various embodiments, one or more of communication devices 102, 104 can include the software, hardware and/or have the functionality and/or structure (or portions thereof) of communication device 201 described herein (and vice versa).

In various embodiments, the core network 106 can include one or more of software, hardware and/or combination software and hardware configured to provide connectivity to and between the communication devices 102, 104. The system 100 can include one or more macro, Femto and/or pico access points (APs) (not shown), base stations (BS) (not shown) or landline networks (e.g., optical landline networks, electrical landline networks) (not shown) communicatively coupled between one or more of the communication devices 102, 104 and the core network 106 to provide connectivity between the communication devices 102, 104 and the core network 106. In various embodiments, the communication devices 102, 104 can communicate via any number of various types of wireless technologies including, but not limited to, cellular, WiFi, WiMax, wireless local area networks (WLAN), etc. In corresponding embodiments, the core network 106 can provide cellular, WiFi, WiMAX, WLAN and other technologies for facilitating such communication. The core network 106 can also include the Internet (or another communication network (e.g., IP-based network), a digital subscriber line (DSL)-type or broadband network facilitated by Ethernet or other technology. The core network 106 can also include, in various embodiments, servers including, email, multimedia, audio, video, news, financial or stock information servers.

The core network 106 can also include short message service (SMS) networks and multimedia message service (MMS) networks. The core network 106 can also include but is not limited to, routers, nodes, switches, interfaces, and/or controllers that can facilitate communication of data to or from the communication devices 102, 104. The core network 106 can transmit and receive voice, text, pictorial, video, audio and/or data traffic to and from the communication devices 102, 104. While only communication devices 102 and 104 are shown, in various embodiments, the core network 106 can include or can be communicatively coupled to other communication devices inside or outside of the network. In various embodiments, the network can also include hardware, software and/or a combination of hardware and software for allocating resources to the communication devices 102, 104, converting or enforcing protocols, establishing and/or providing levels of Quality of Service (QoS), applications or services in the network, translating signals, and/or performing other desired functions to facilitate system interoperability and communication to or from the communication devices 102, 104.

In various embodiments, the core network 106 can include or can be communicatively coupled to one or more of multimedia servers (not shown), email servers (not shown), data store components (not shown), Internet (not shown) for communicating one or more of text or email messages, data, pictures, multimedia, voice or video.

The core network 106 can also include data store components and/or memory storing information and/or computer-readable storage media storing computer-executable instructions enabling various operations by the communication devices 102, 104. In some embodiments, the core network 106 can include data store components and/or memory storing computer-executable instructions and/or settings for providing facilitating management of SM information to, from or within the communication devices 102, 104. In some embodiments, a data store component can store settings, and/or memory can store computer-executable instructions, enabling the communication device 104 to intelligently and selectively manage SM information retrieved from SNSs.

In various embodiments, management can include retrieval of selective SM information, which can be intelligently identified based on the information stored in the communication devices 102, 104. For example, the contacts stored in or accessible by the communication devices 102, 104 can provide a wealth of information for intelligently managing SM information. As an example, in some embodiments, the network 106 can retrieve SM information for SNS friends of the owner of the communication devices 102, 104 that are identified as contacts in the communication devices 102, 104. Similarly, the communication devices 102, 104 can manage friend relationships and de-friend friends based on updated status information.

In some embodiments, the network 106 can include rules and/or policies for management of SM information in accordance with embodiments disclosed herein. For example, rules and policies can be such as those discussed below with reference to batch linking SM information to contacts. As described herein, batch linking SM information to contacts can be for obtaining, intelligently retrieving and/or selectively downloading SM information at the communication device 201. Other rules and policies for linking, unlinking and/or de-friending are also described herein and can be facilitated by the network 106 and/or the communication devices 102, 104. While batch linking is described, embodiments herein also include those directed to manual linking of SM information and contacts as described below with reference to FIG. 3. Manual linking can also be for obtaining, retrieving and/or selectively downloading SM information at the communication device 201, however, with manual linking, the decision as to whether to link is performed by the user of the communication device 201 (whereas the decision can be performed automatically by the communication device 201 with batch linking).

Figure 2:
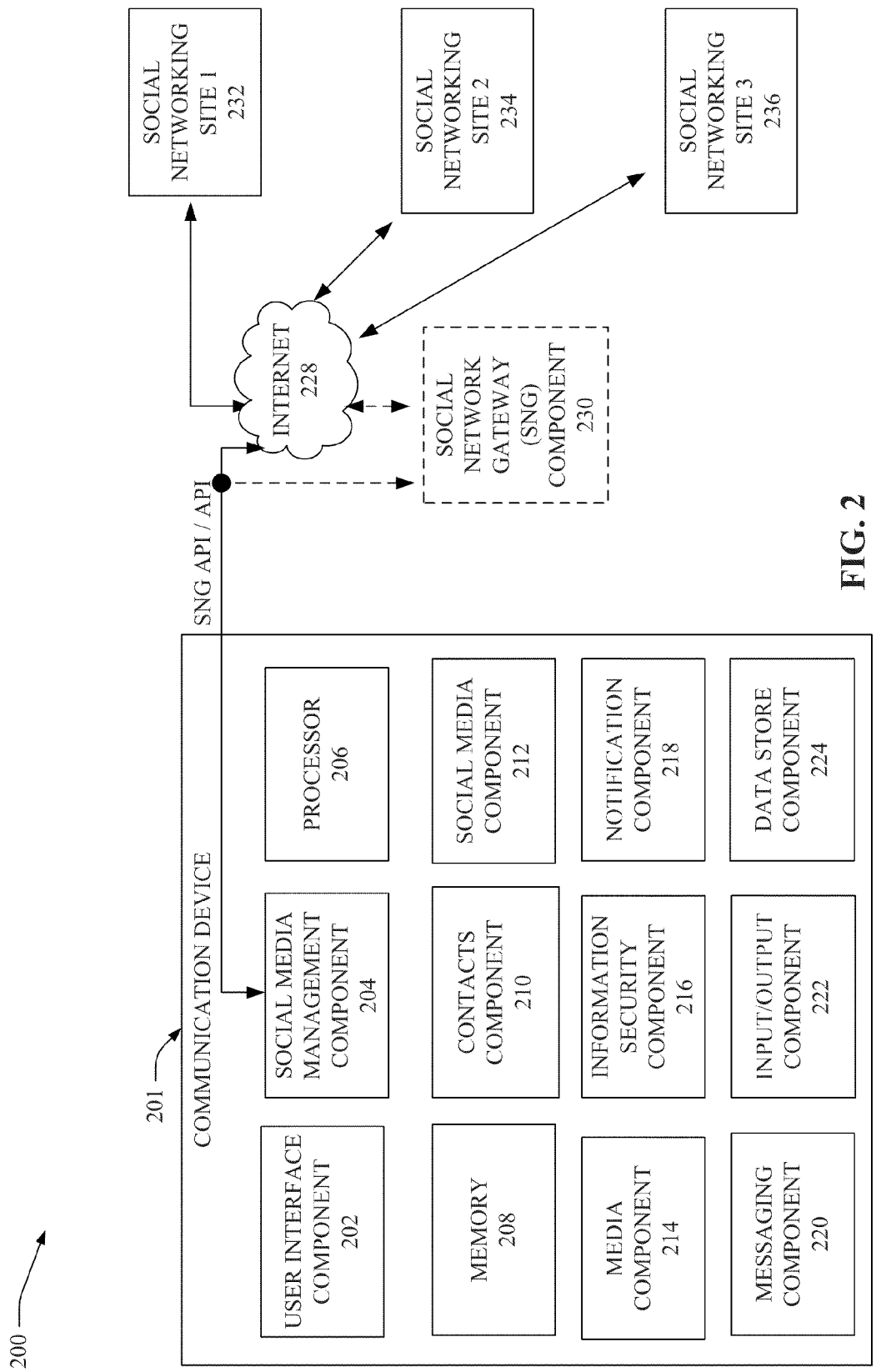
FIG. 2 illustrates another block diagram of an exemplary system that facilitates management of SM information for communication devices in accordance with various aspects and embodiments described herein.

Referring to FIGS. 1 and 2, after the SM information is linked to a contact, the communication devices 104, 102, 201 can populate a social card stored on or accessible by the communication device 104, 201, 201. The social card can be illustrated as a UI display that includes SM information from one or more SNSs for a SN contact linked to a contact. In some embodiments, the SM information from one or more SNSs for a SN contact can be aggregated for all SNSs with which the SN contact is associated. The social card can be one of the cards included as the 3-screen triptych UI described in U.S. Non-Provisional patent application Ser. No. 12/643,726, filed Dec. 21, 2009, titled "SYSTEMS, APPARATUS, METHODS AND COMPUTER-READABLE STORAGE MEDIA FOR FACILITATING INTEGRATED MESSAGING, CONTACTS AND SOCIAL MEDIA FOR A SELECTED ENTITY" and incorporated herein by reference in its entirety. The communication device can populate the social card with SM information associated with the SN contact.

Referring back to FIG. 1, in various embodiments, the communication devices 102, 104 can be mobile, wireless, wireline and/or optical devices. The communication devices 102, 104 can include, but are not limited to, a mobile or cellular telephone including, but not limited to, a smartphone, BLUETOOTH® device, a 3GPP UMTS phone, a personal digital assistant (PDA), computer, IP television (IPTV), wireline phone with mobile messaging functionality, gaming console, a set top box (STB), a multi-media recorder, a multi-media player, a video recorder, a video player, an audio recorder, an audio player, laptop, a printer, a copier and/or a scanner.

In various embodiments, the communication devices 102, 104 can include hardware, software or a combination of hardware and software facilitating operation according to one or more communication protocols described above with reference to the core network 106, or the functionality facilitated by the hardware, software or combination hardware and software described above with reference to the core network 106. The communication protocols and/or functionality can include, but is not limited to, MMS, SMS, WLAN, WiFi, WiMAX, BLUETOOTH® protocol, text messaging, electronic mail messaging, facsimile, multimedia and/or any number of other protocols or functionalities as described above with reference to the communications protocols or functionalities facilitated by core network 106. In various embodiments, the communication devices 102, 104 can transmit and/or receive voice, text, pictorial, video, audio and/or data traffic to and from the communication devices 102, 104. By way of example, but not limitation, the communication devices 102, 104 can receive profile photos and other images or photos associated with a linked SN contact. As other examples, text can include contact information for the SN contact, feeds from a single SNS, or aggregated feeds from multiple SNSs, with which the linked SN contact is affiliated, video associated with the SN contact, and the like.

In some embodiments, the communication devices 102, 104 can include hardware, software and/or a combination of hardware and software to facilitate providing management of SM information, from, to or within the communication devices 102, 104 as described herein. For example, in various embodiments, as shown at communication device 102, the communication devices 102, 104 can include a SM management component 108 and a UI component 110 for SM management at the communication device 102. In various embodiments, the UI component 110 can facilitate receiving or outputting information for providing or enabling the one or more SM management functions or protocols including, but not limited to, processing and selectively retrieving SM information and/or display of the same via social and/or contacts cards, providing or enabling communication to or from the communication device 102, accessing information stored within, or storing information within, the communication device 102, or any controlling the communication device 102, or receiving information output from the communication device 102, via the UI component 110.

While SM management methods and communication devices facilitating such are described below with reference communication device 201, in various embodiments, the communication device 201 can be or include one or more of the functions or structure (or portions thereof) of communication device 102, 104 (and vice versa).

Turning back to FIG. 2, FIG. 2 illustrates a block diagram of an exemplary system that facilitates management of SM information for communication devices in accordance with various aspects and embodiments described herein.

The system 200 can include a communication device 201. In some embodiments, the system 200 can also include one or more additional components. For example, the additional components can include: a SN gateway (SNG) component 230, the internet 228 and/or one or more SNSs 232, 234, 236. The SNSs 232, 234, 236 can be the FACEBOOK® SNS, TWITTER® SNS and/or MYSPACE® SNS in various embodiments. In other embodiments, the SNSs can be any sites from which SM information can be retrieved by the communication device 201, including, but not limited to, the LINKEDIN (and design)® SNS, the MYLIFE® SNS and the like. In some embodiments, the communication device 201, the internet 228 and the SNG component 230 (and in various embodiments, one or more of the SNSs 232, 234, 236) can be communicatively coupled to one another to perform the functions of system 200 described herein.

While the SNG component 230 is shown in FIG. 2, the SNG component 230 is not a necessary component of system 200. By way of example, but not limitation, the communication device 201 can be communicatively coupled to the SNSs 232, 234, 236 via the internet 228 without the SNG component 230. For example, the communication device 201 can be configured to retrieve information from the SNSs 232, 234, 236 and/or to provide information to the SNSs 232, 234, 236 using native APIs.

As such, while the SNG component 230 can be employed (e.g., as a network layer) between the communication device 201 and the SNSs 232, 234, 236, and can be useful for facilitating communication between the communication device 201 and the SNSs 232, 234, 236 if the SNSs 232, 234, 236 modify their APIs (by making corresponding modifications at the SNG component 230 in lieu of modifications at the communication device 201), the SNG component 230 is not a necessary element and the modifications can be made at the communication device 201 to facilitate communication in the event of such changed APIs.

In embodiments of the system 200 that include the SNG component 230, the SNG component 230 can include hardware, software and/or a combination of hardware and software for providing communication between the SNSs and the communication device 201. In various embodiments, the SNG component 230 can be a network server with which the communication device 201 is communicatively coupled. In some embodiments, the SNG component 230 can be located on a first network with the communication device 201 and the SNSs 232, 234, 236 can be located on a second network. The second network can be included in the internet 228 in some embodiments.

The SNG component 230 can be configured to enable the communication device 201 to fetch information from the SNG component 230. For example, the SNG component 230 can be configured to receive SNG application programming interface (SNG API) calls from the communication device 201. The SNG API calls can request information from the SNG component 230. For example, the SNG API calls can request SN feed information, SN status updates, SN profile photos and any other SM information associated with a SNS. The SNG component 230 can be configured to output the requested information to the communication device 201 upon receipt of the SNG API calls.

In some embodiments, as described above, when a SNG component 230 is not employed in system 200, the SNG APIs can be replaced with APIs configured to allow communication between the communication device 201 and the SNSs 232, 234, 236.

In either case, in various embodiments, the calls can be HTTP RESTful API calls. By way of example, but not limitation, the SNG component 230 can identify a subscriber of a wireless network service associated with the communication device 201 and provide the identity of the subscriber in the form of an HTTP request header. Information can then be routed depending on the API call and controlled by configuration parameters. The parameters can be updateable over-the-air (OTA) in some embodiments. In these embodiments, the communication device 201 communicates with the SNG component 230 via the wireless application protocol (WAP).

In general, the SNG component 230 can be configured to communicate with the SNSs 232, 234, 236. The SNG component 230 can transmit information to the SNSs 232, 234, 236 and/or receive information from the SNSs 232, 234, 236.

By way of example, but not limitation, in some embodiments, credentials for the communication device 201 to sign-in to or connect to or retrieve information from a SNS can be received at the communication device 201 and output to the SNG component 230. The SNG component 230 can be configured to receive the credential information and output the credentials to the SNS of interest. While logged into the SNS, the SNG component 230 is provided access to receive and transmit information to and from the SNSs 232, 234, 236. As such, the SNG component 230 can be configured to provide SM information from the SNSs 232, 234, 236 to the communication device 201.

By way of other examples, but not limitation, the SNG component 230 can be configured to perform registration of the communication device 201 (or wireless network subscriber associated with the communication device 201), transmit login and logoff information for the user of the communication device 201 from the SNSs 232, 234, 236, retrieve mini-feed data from the SNSs 232, 234, 236, retrieve SN contact activity, SN contact status, status comment details, photos, photo comments details, SN contacts list, publish media to the SNS and/or provide a status of media being published to the SNSs 232, 234, 236.

Embodiments of the system 200 can provide efficient management of SM information at the communication device 201. For example, in some embodiments, the SNG component 230 and/or communication device 201 are configured to retrieve and process SM information for SN contacts intelligently selected by the system 200. Accordingly, the number of SN contacts for which information must be processed is intelligently minimized. Additionally, selection can be performed automatically by the communication device 201 so as to minimize user input, significantly improve the user experience and/or reduce storage of the communication device 201 dedicated to information about SN contacts that are rarely contacted by the communication device 201.

Further to that already provided above, the communication device 201 will now be described in greater detail. In some embodiments, and as shown in FIG. 2, the communication device 201 can include a contacts component 210, a SM management component 204, a user interface (UI) component 202, a SM component 212, a messaging component 220, a notification component 218, a processor 206, an input/output (I/O) component 222, an information security component (ISC) 216, a data store component 224, a memory 208 and/or a media component 214. One or more of the components can be communicatively coupled to one another to perform one or more of the functions of the communication device 201 described herein.

Referring first to the I/O component 222, the I/O component 222 can include hardware, software and/or a combination of hardware and software facilitating receipt and output of SM information, contacts information, messaging information and/or control information (e.g., API call information) to and from the communication device 201. The receipt and transmission of such information can be utilized to provide management of SM information at the communication device 201.

The communication device 201 can also include the ISC 216. Authentication information and personal data transmitted between the communication device 201 and the SNG component 230 can be protected through the use of security facilitated by the ISC 216. The ISC 216 can be configured to provide security as follows.

A public/private API key mechanism can be used for authorizing the communication device 201 to access the SNG component 230. This key can be used to sign one or more HTTP requests that are sent to the SNG component 230 (or to a server associated with the SNG component 230) as a way to identify the communication device 201 to the SNG component 230. Requests from unauthorized communication devices can be rejected by the SNG component 230.

The API key and/or user authentication data can be encrypted using Advanced Encryption Standard (AES) using Cipher Block Chaining (CBC) and PKCS7 Padding. Username and login information can be stored in data store component 224 (or any other database accessible by the SM management component 204 and/or the SNG component 230). In some embodiments, no passwords are saved on the communication device 201 or on the server associated with the SNG component 230.

In some embodiments, whether a subscriber identity module (SIM) card has been changed on the communication device 201 can be determined. Cached data can be immediately deleted prior to launching the application of the SM management component 204 if a determination is made that the SIM has been changed.

If the application for the SM management component 204 is launched after a SIM card change, an authorization call can be made to the SNG component 230 to detect whether the subscriber associated with the new SIM card is the different from the subscriber previously using the application. If it is a different subscriber, the user of the communication device 201 can be prompted to reset the application and cannot proceed until doing so. Resetting the application can delete all existing SN credentials and links so that the new SIM owner cannot see the data for the prior user of the communication device 201.

In some embodiments, the SN sessions can periodically expire as dictated by the SNSs 232, 234, 236. The user of the communication device 201 can be required to re-authenticate credentials before the user can see any new data from the SNS for which the SN has expired. These security measures can be implemented with the help of the data used to identify subscribers for a wireless network and stored in the data store component 224 (or any database accessible by the communication device 201 and/or the SNG component 230).

Turning now to the UI component 202, the UI component 202 can include hardware, software and/or a combination of hardware and software facilitating display of information from the communication device 201 and/or receipt of inputs to the communication device 201. The information can include graphical information (e.g., profile photos), textual information (e.g., contacts information, SN feed information, SN updates), video information (e.g., videos associated with SNSs) and the like.

In various embodiments, the UI component 202 can facilitate display of a social card for a linked SN contact, the triptych UI referenced above, and UIs illustrating information for informing the user of the communication device 201 about the process of batch linking, downloading of SM information and/or generally performing SM information management.

The UI can be any number of different types of UIs including, but not limited to, a graphical user interface (GUI), a touch-sensitive interface (e.g., a touch screen), an interface having capability for receiving audio input (and outputting audio information) and the like. In some embodiments described herein, the UI can include a touch screen configured to receive inputs at the touch screen and graphically output SM information from the touch screen. The UI can be enabled to display alpha and/or numeric characters, message balloons, images, video, icons and the like for SM information management. For example, the UI can display the display regions described in more detail below, and shown at FIGS. 12, 13, 14, 15, 16, 17 and 18.

FIGS. 12, 13, 14, 15, 16, 17 and 18 detail various display regions that the UI component 202 can cause to be output to facilitate management of SM information for the user of the communication device 201.

Figure 12:
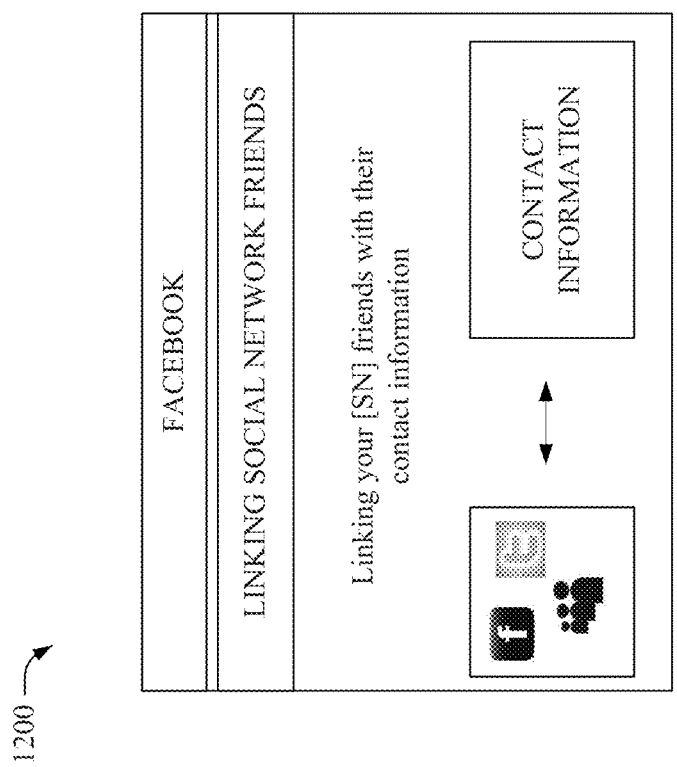
FIGS. 12, 13, 14, 15, 16, 17 and 18 illustrate display regions of user interfaces that facilitate management of SM information for communication devices in accordance with various aspects and embodiments described herein.

FIG. 12 illustrates a display region 1200 displaying information indicative of an ongoing process to batch link or manual link SN contacts with contacts stored on or accessible by the communication device 201.

Figure 13:
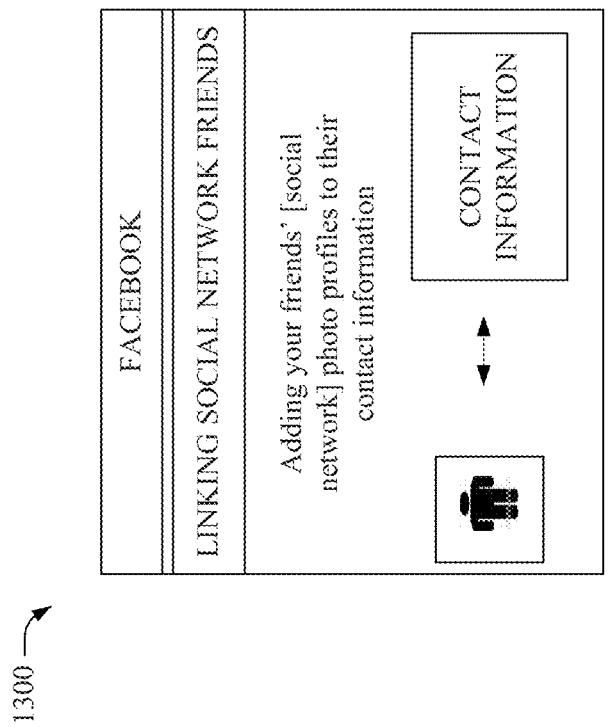

FIG. 13 illustrates a display region 1300 displaying information indicative of an ongoing process to add profile photos associated with linked SN contacts to the contact information stored on or accessible by the communication device 201. As shown in FIG. 13, profile photos (and other SM information) can be intelligently retrieved from SNSs and obtained at the communication device for SN contacts that are linked with contacts stored on or accessed by the communication device 201.

Figure 14:
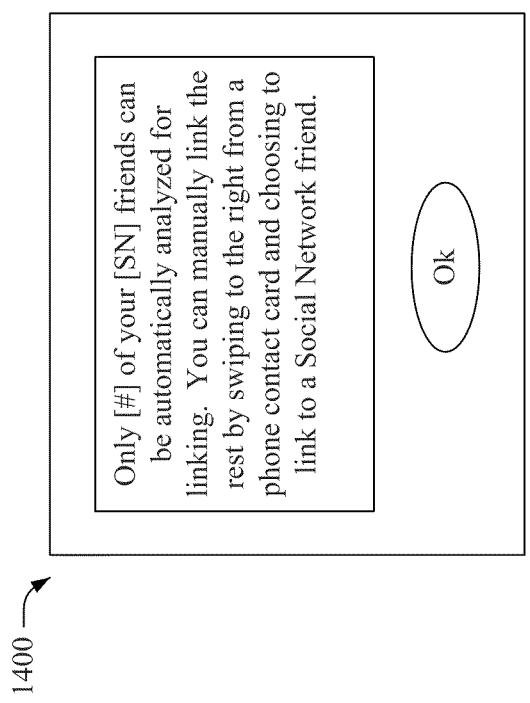

FIG. 14 illustrates a display region 1400 displaying information indicative of a limitation that the communication device 201 can place on a number of SN contacts that can be batched linked during a single batch linking process.

Figure 15:
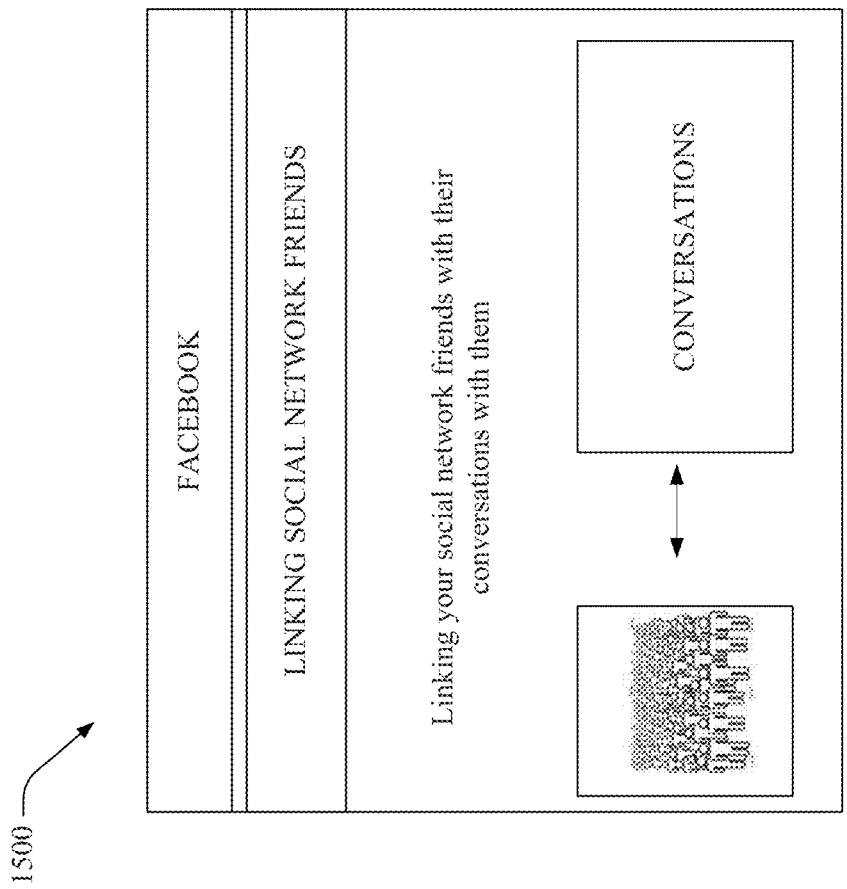

FIG. 15 illustrates a display region 1500 displaying information indicative of an ongoing process to batch link or manual link SM information to conversations with the SN contacts associated with the SM information. The conversations can be stored on or accessible by the communication device 201.

Figure 16:
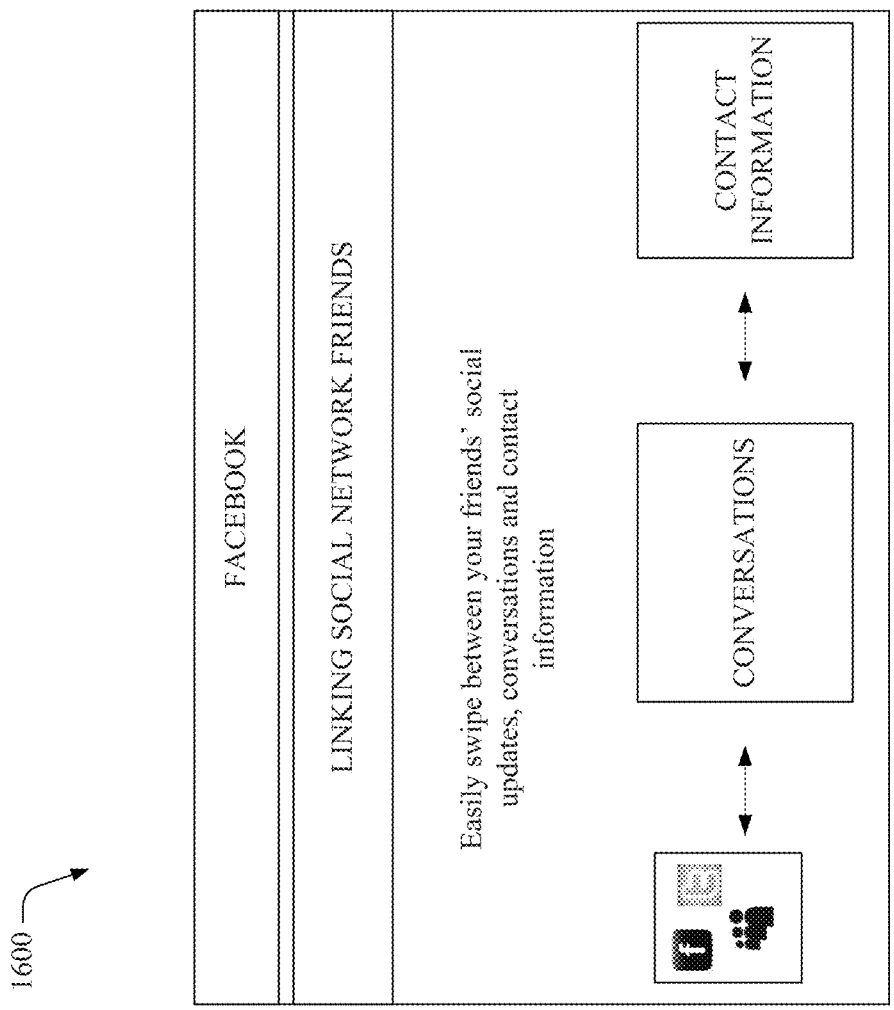

FIG. 16 illustrates a display region 1600 displaying information indicative of the integration between the SM information, contacts and conversations for linked SN contacts. The integration can be performed by the application integration component (AIC) below and/or discussed with reference to U.S. Non-Provisional patent application Ser. No. 12/643,726, filed Dec. 21, 2009, titled "SYSTEMS, APPARATUS, METHODS AND COMPUTER-READABLE STORAGE MEDIA FOR FACILITATING INTEGRATED MESSAGING, CONTACTS AND SOCIAL MEDIA FOR A SELECTED ENTITY" for implementation of the triptych UI.

Figure 17:
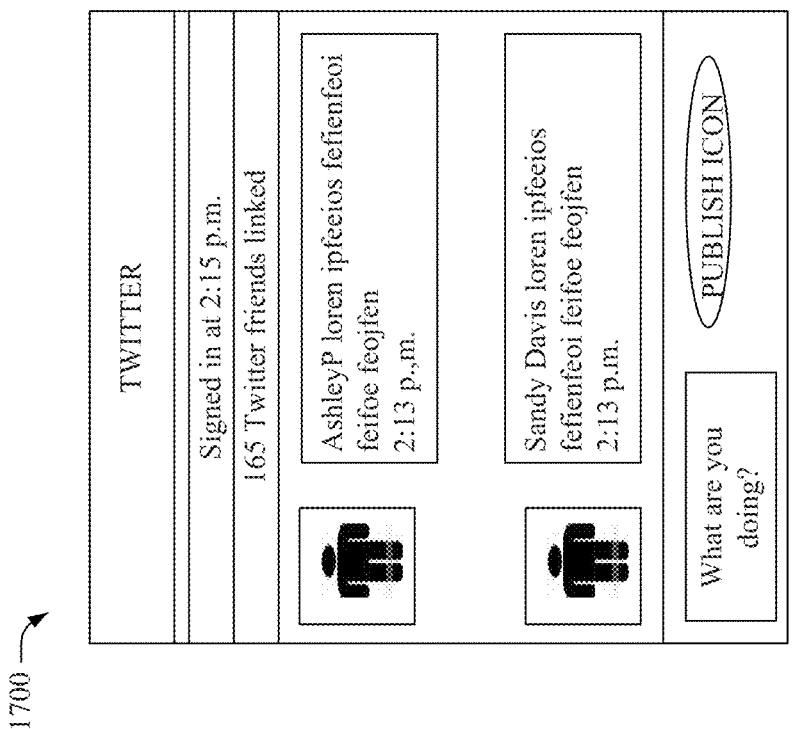

FIG. 17 illustrates a display region 1700 displaying information indicative of SM information for linked SN contacts. In the embodiment shown, the user of the communication device 201 is signed into the TWITTER® SNS (the user signed in at 2:15 p.m.) and the TWITTER® SNS contacts who have usernames "AshleyP" and "Sandy Davis" are linked to the contacts stored on or accessible by the communication device 201. Display region 1700 illustrates one example of a social card.

Figure 18:
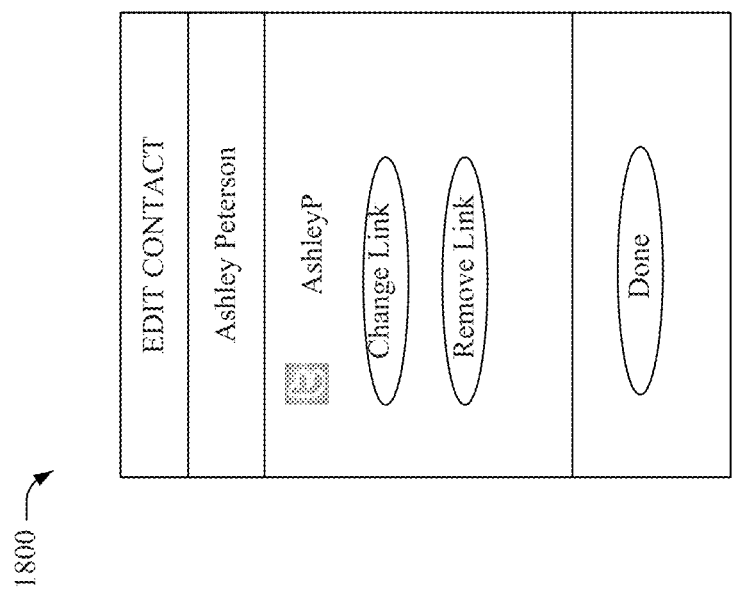

FIG. 18 illustrates a display region 1800 displaying information enabling a user of the communication device 201 to remove (or change) a link currently existing between a SN contact and the contact stored on or accessible by the communication device 201.

Turning back to FIG. 2, and to the contacts component 210, the contacts component 210 can be configured to control the operation of one or more contact applications. The contact applications can provide and/or enable display, deletion or editing contacts information. By way of example, but not limitation, contacts information can include the first and/or last name of a contact stored on or accessible by the communication device 201, a profile for a contact, the email address for a contact, and/or avatar or images associated with the contact. In various embodiments, the contacts information can also include other information that can be compared to SM information to determine whether the SN contact associated with the SM information corresponds to or is the same entity as the contact. In some embodiments, the contacts information can include mobile, home, work and/or fax numbers, physical street addresses, social network identification information, a social network identification, voice information, geographical contact information, biographical information such as the birthday or date of incorporation of the contact, preferences such as favorite foods, and the like.

The contacts component can be employed in conjunction with the SM management component 204 to facilitate SM management. Turning now to the SM management component 204, the SM management component 204 can include software, hardware and/or a combination of hardware and software for providing SM information management to, from or within the communication device 201.

In some embodiments, the SM management component 204 can include hardware, software and/or a combination of hardware and software for performing automatic batch linking of SN contacts and contacts stored on or accessible by the communication device 201. The batch linking can be performed for a number of SN contacts and/or for a number of contacts in a batch. As such, massive amounts of information can be automatically and intelligently retrieved from the SNS to the communication device 201 with little to no user intervention in various embodiments. The decisions as to which SN contacts to link can be performed automatically by the communication device 201 in some embodiments.

The relationships between the contacts and the SM information (or profiles for the contacts and SM information) can be automatically analyzed and batched linking can be performed for a number of SN contacts. Linking the contacts with the SM information can enable the communication device 201 to perform one-time and/or periodic retrieval and/or display of updated or existing information about the linked SN contact. For example, the communication device 201 can retrieve and/or display updated or existing wall posts, status updates and/or feeds. As such, the communication device 201, in some embodiments, can reduce the need for a user to manually review each SN contact on a SNS to determine if the user should link the SN contact to a corresponding contact of the communication device 201 because, in some embodiments, the embodiments herein can intelligently select SN contacts of interest to batch link. Accordingly, the time to link relevant SN contacts can be significantly reduced over those embodiments requiring manual linking, and the user experience can be improved.

The SM management component 204 can perform a number of tasks for linking contacts and SM information, processing or filtering SM information from the SNSs 232, 234, 236 and/or providing status updates and other SM information to the SNSs 232, 234, 236. For example, in embodiments described below with reference to methods herein, the SM management component 204 can selectively and intelligently de-friend (or de-link) contacts for which status updates indicate de-friending (or de-linking) to be an appropriate course of action. In such cases, the UI can display the display region shown with reference to FIG. 18 for manual de-friending (or de-linking) and, in some embodiments, can perform de-friending (or de-linking) automatically without intervention by the user of the communication device 201.

In some embodiments, the application for the SM management component 204 can be a data intensive application with all data retrieved from the network. The amount of data retrieved from the network can be limited by the use of maximum limits on each kind of data and redundant network traffic can be avoided by the use of a caching mechanism that has one or more pre-defined parameters to balance network traffic versus disk storage on the communication device. These maximum limits for managing network traffic and caching parameters can be predefined and updated over-the-air (OTA).

In various embodiments, the SM management component 204 can be communicatively coupled to the contacts component 210. The SM management component 204 can be configured to retrieve contacts information stored on or accessible by the contacts component 210. API calls can be defined by a contacts application of the contacts component 210 to enable the retrieval of contacts information in some embodiments.

The terms and conditions for the use of the SNS can be accepted using the SM management component 204, adding, signing-in and removing SNSs, batch and manual linking of the contacts in the communication device 201 with the SN contacts, viewing the latest status updates, wall posts and photo album updates from a SN and/or viewing the latest status updates, wall posts and photo album updates for an individual from a SNS can be facilitated using the SM management component 204.

The updates and posts can be shown on a linked card or an unlinked card. In some embodiments, the unlinked social card can show updates for a SN contact on a single SNS that is not linked to a contact, while a linked social card shows updates for a contact that is linked to a single SN contact on multiple SNs. The SM management component 204 can also be configured to provide viewing of photos from a photo album updated on a SNS and saving individual photos and the ability to update the user's status on a SNS.

Figure 3:
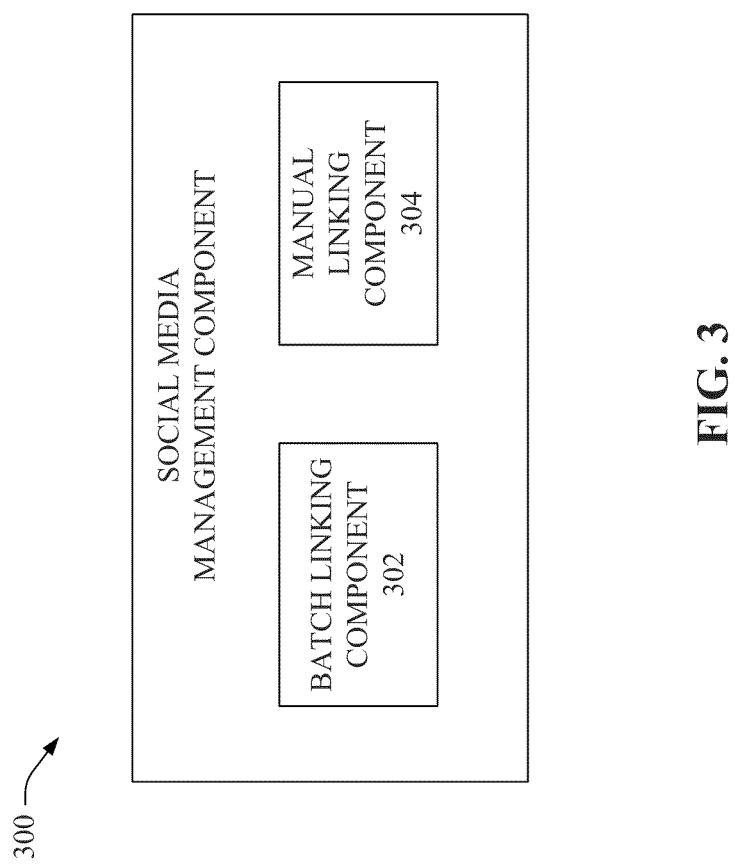
FIG. 3 illustrates a SM management component that facilitates management of SM information for communication devices in accordance with various aspects and embodiments described herein.

In some embodiments, the SM management component 204 can include the structure and/or functionality of SM management component 300 of FIG. 3. FIG. 3 illustrates one embodiment of the SM management component 300.

In some embodiments, the SM management component 300 can include a batch linking component 302 configured to enable automatic, communication device-driven batch linking of contacts with SM information. In some embodiments, the batch linking is performed with no intervention by the user of the communication device 201. In some embodiments, the SM management component 300 can also include a manual linking component 304 configured to enable user-driven manual linking of contacts with SM information.

Linking can be initiated in some embodiments, when a user of the communication device 201 logs into a SNS. The batch linking component 302 can automatically review SN contacts of the user of the communication device 201. In some embodiments, the batch linking component 302 can attempt to match the names of the SN contacts with names from the contacts stored on or accessible by the communication device. The batch linking component 302 can perform a batch sync of contacts and batch link SN contacts with contacts. In some embodiments, the batch linking component 302 can perform batch linking by invoking an application of the contacts component 210, accessing the address book of the communication device 201, and retrieving a SN list of the SN contacts. Members of the SN list can be linked to the contacts in the address book.

In some embodiments, the batch linking component 302 can be configured to access information associated with one or more SN contacts. The batch linking component 302 can also access information associated with one or more contacts of a contacts list. The batch linking component 302 can batch link the one or more SN contacts to the one or more contacts of a contacts list.

In some embodiments, batch linking can include batch processing a plurality of SN contacts, wherein the plurality of SN contacts comprise the one or more SN contacts. The batch processing can include selecting one or more SN contacts for batch linking; and batch linking the one or more SN contacts to one or more contacts stored on or accessible by the communication device 201. Batch linking can provide retrieval of SM information to the communication device 201.

In some embodiments, batch processing a plurality of SN contacts can include: comparing the plurality of SN contacts to the one or more contacts; selecting as the one or more SN contacts, ones of the plurality of SN contacts that correspond to the one or more contacts; and determining whether the one or more SN contacts are linked or unlinked to corresponding ones of the one or more contacts. Batch processing can also include linking the one or more SN contacts with the corresponding ones of the one or more contacts. Linking can be performed for the one or more SN contacts corresponding to the one or more contacts, and that are unlinked to any contact.

Selecting the SN contacts for batch linking can be automatically and intelligently performed by the batch linking component 302 based, at least, on whether the one or more SN contacts correspond to (or is associated with information that matches with information of) the one or more contacts.

In some embodiments, the information need not match but merely provide a relationship between the information of the SN contact and the contact that informs the communication device 201 that there is a correspondence between the SN contact and the contact. By way of example, but not limitation, if a subset of characters of a first or last name of a SN contact match a full first or last name of a contact, the batch linking component 302 can determine that the SN contact corresponds to the contact. Other examples of information that can be evaluated to determine if a SN contact corresponds to a contact includes, but is not limited to, an address, an email address or a telephone number.

By way of another example, images associated with the SN contact can be compared with images associated with the contact to determine a likelihood that the SN contact is the same person or entity as the contact. For example, image processing can be employed to identify similarities in images.

In some embodiments, after linking, a social card stored on or accessible by the communication device 201 can output SM information. In some embodiments, the social card can be displayed by the UI of the communication device. FIG. 17 can be an illustration of a social card for SN contacts linked to contacts stored on or accessible by the communication device 201.

The social card can be associated with the linked contact. SM information can include information from a SN with which the one of the one or more SN contacts linked to the one of the one or more contacts is affiliated, the information comprises at least one of: a profile photo, a username, first or last names associated with a SN, a SN website posting, a SN status update, one or more SN feeds.

The batch linking component 302 can determine whether to overwrite preexisting links and/or replace preexisting links with new links to different contacts. In various embodiments, the batch linking component 302 can link more than one SN contact to a contact. In various embodiments, the batch linking component 302 can determine whether a link is already created between the SN contact and the contact.

In some embodiments, there is a maximum number of SN contacts that can be batch linked during a single batch linking process. In these embodiments, the batch linking component 302 is also configured to determine if a maximum number of SN contacts has been met and forgo batch linking a number of SN contacts greater than the maximum number. The batch linking component can output a message via the UI such as that shown at FIG. 13 in some embodiments.

In various embodiments, the SM management component 300, 204 or 108, the batch linking component 302 and/or the communication device 201 can be configured to perform the methods of 400, 500, 600, 700, 800, 900, 1000, 1100.

As described above, embodiments described herein enable a communication device to automatically retrieve SM information for SN contacts that correspond to the contacts of the communication device. The relationships between the contacts and the SM information (or profiles for the contacts and SM information) can be automatically analyzed and batched linking can be performed for a number of SN contacts. Linking the contacts with the SN contacts can enable the communication device to periodically retrieve and display updated or existing information about the selected linked SN contacts. As such, some embodiments can avoid or reduce the likelihood of the communication device unintelligently retrieving a massive dump of SN information from SN contacts with which the communication device (or user of the communication is not in regular contact, and hence, information for which is not included in the contacts for the communication device).

Figure 4:
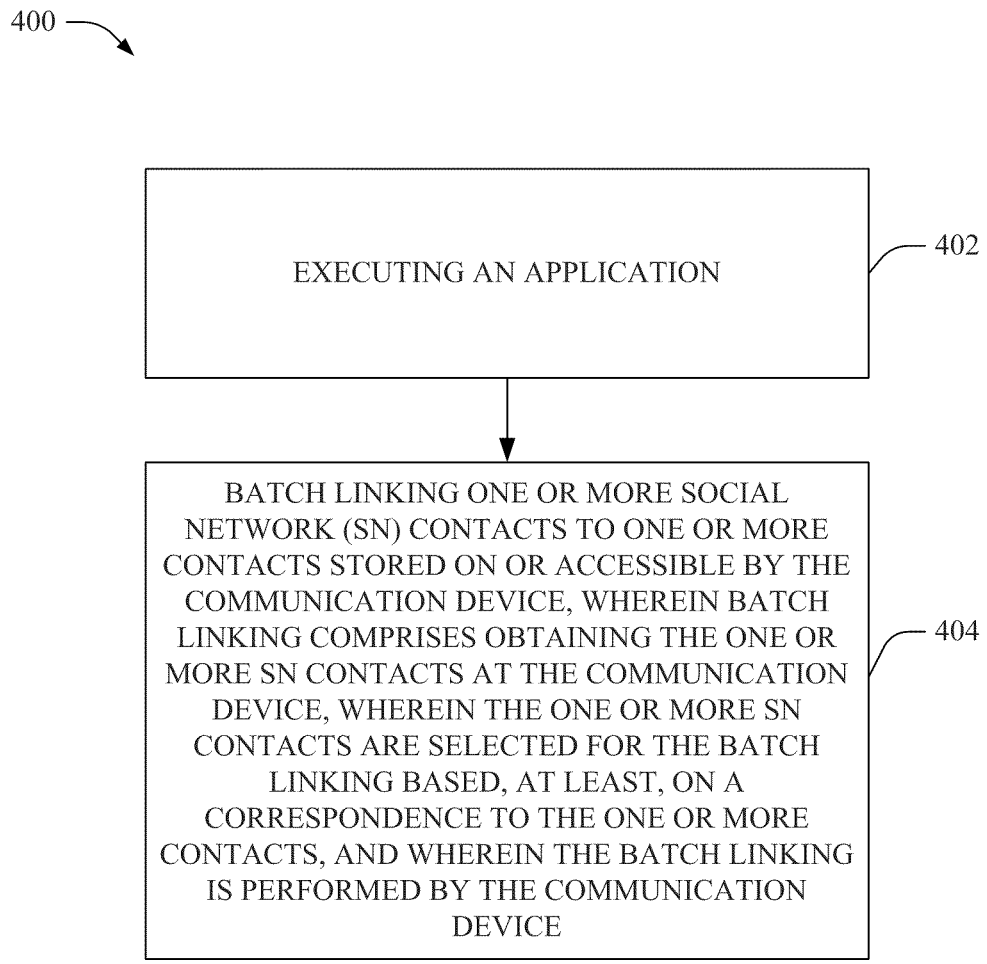
FIGS. 4, 5, 6, 7, 8, 9, 10 and 11 illustrate exemplary flowcharts of methods that facilitate management of SM information for communication devices in accordance with aspects described herein.

For example, referring to FIG. 4, a method for facilitating batch linking between contacts and SM is provided. Method 400 can include executing an application. In some embodiments, at 402, the method 400 can include executing an application. In some embodiments, the application can be a batch linking application. In various embodiments, a batch linking application can be an application adapted to link one or more SN contacts with one or more contacts stored on or accessible by the communication device.

At 404, the method 400 can include batch linking one or more social network (SN) contacts to one or more contacts stored on or accessible by the communication device, wherein the batch linking comprises obtaining the one or more SN contacts at the communication device, wherein the one or more SN contacts are selected for the batch linking based, at least, on a correspondence to the one or more contacts, and wherein the batch linking is performed by the communication device.

In some embodiments, batch linking can include batch processing a plurality of SN contacts, wherein the plurality of SN contacts comprise the one or more SN contacts. In various embodiments, the SN contacts are associated with at least one of a FACEBOOK® SNS, a TWITTER® SNS or a MYSPACE® SNS.

In some embodiments, method 400 can include displaying (not shown), via a UI, a contacts card associated with a one of the one or more contacts on the contacts list, wherein the contacts card includes SM information for the linked SN contacts. In some embodiments, method 400 can include displaying (not shown) a social card including SM information for one or more linked SN contacts.

In some embodiments, a contacts list can be associated with a communication device. In this embodiment, the method 400 can further include providing (not shown), on social cards respectively associated with the one or more contacts on the contacts list linked to the one or more SN contacts, SM information for the linked one or more SN contacts. The SM information can include a profile photo, a username, first or last names associated with a SNS, a SNS posting, a SNS status update, one or more SNS feeds.

Figure 5:
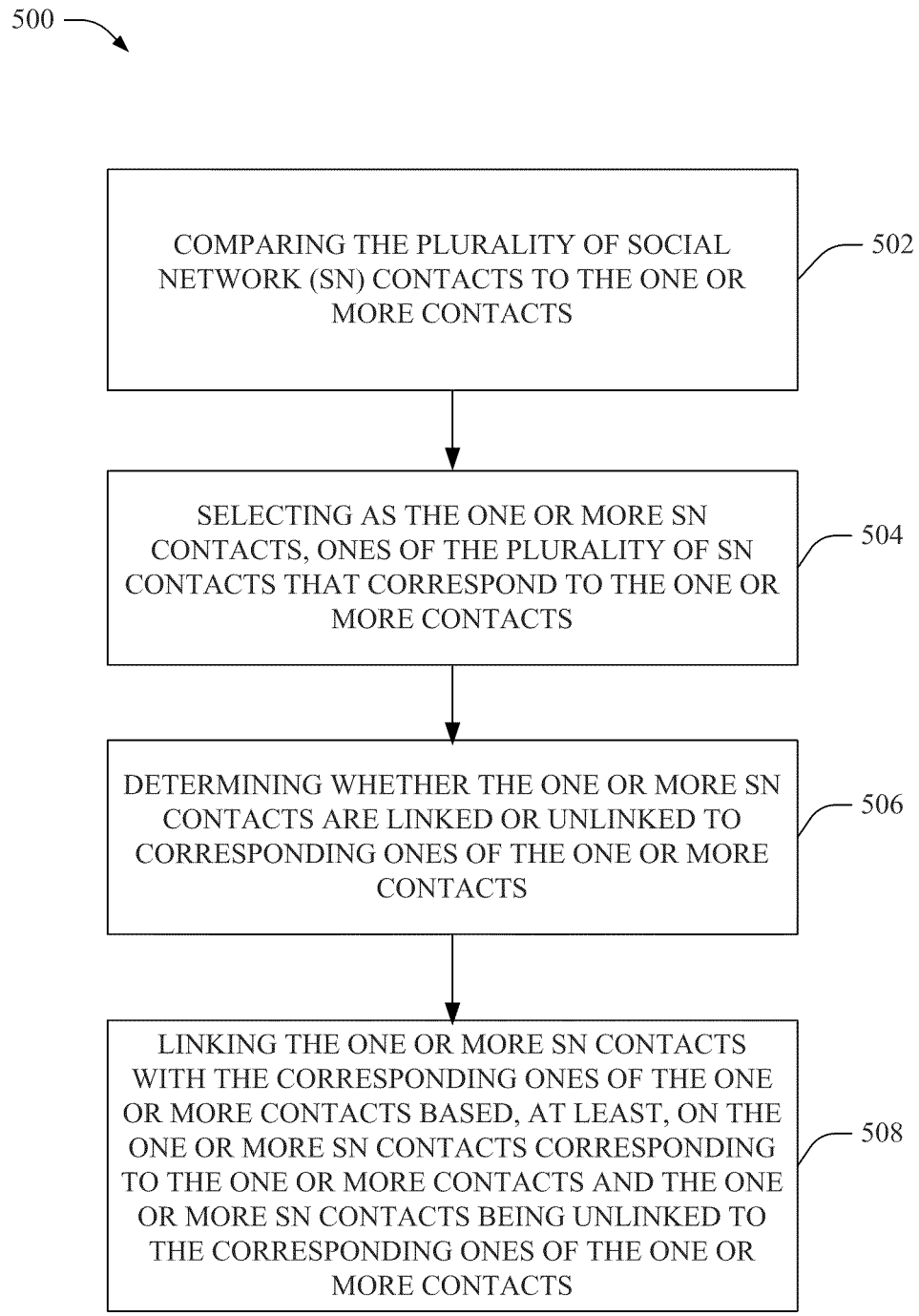

Referring to FIG. 5, a method for batch processing can be as follows. At 502, method 500 can include comparing the plurality of SN contacts to the one or more contacts.

At 504, method 500 can include selecting as the one or more SN contacts, ones of the plurality of SN contacts that correspond to the one or more contacts. In some embodiments, selecting the one or more SN contacts can include: comparing information of the one or more SN contacts with information of the one or more contacts; and determining the one or more SN contacts for which the information of the one or more SN contacts matches the information of the one or more contacts.

In some embodiments, the information of the one or more SN contacts and the information of the one or more contacts can include at least one of: first and last names, an image, an address, an email address or a telephone number At 506, method 500 can include determining whether the one or more SN contacts are linked or unlinked to corresponding ones of the one or more contacts.

At 508, method 500 can include linking the one or more SN contacts with the corresponding ones of the one or more contacts based, at least, on the one or more SN contacts corresponding to the one or more contacts and the one or more SN contacts being unlinked to the corresponding ones of the one or more contacts.

Figure 6:
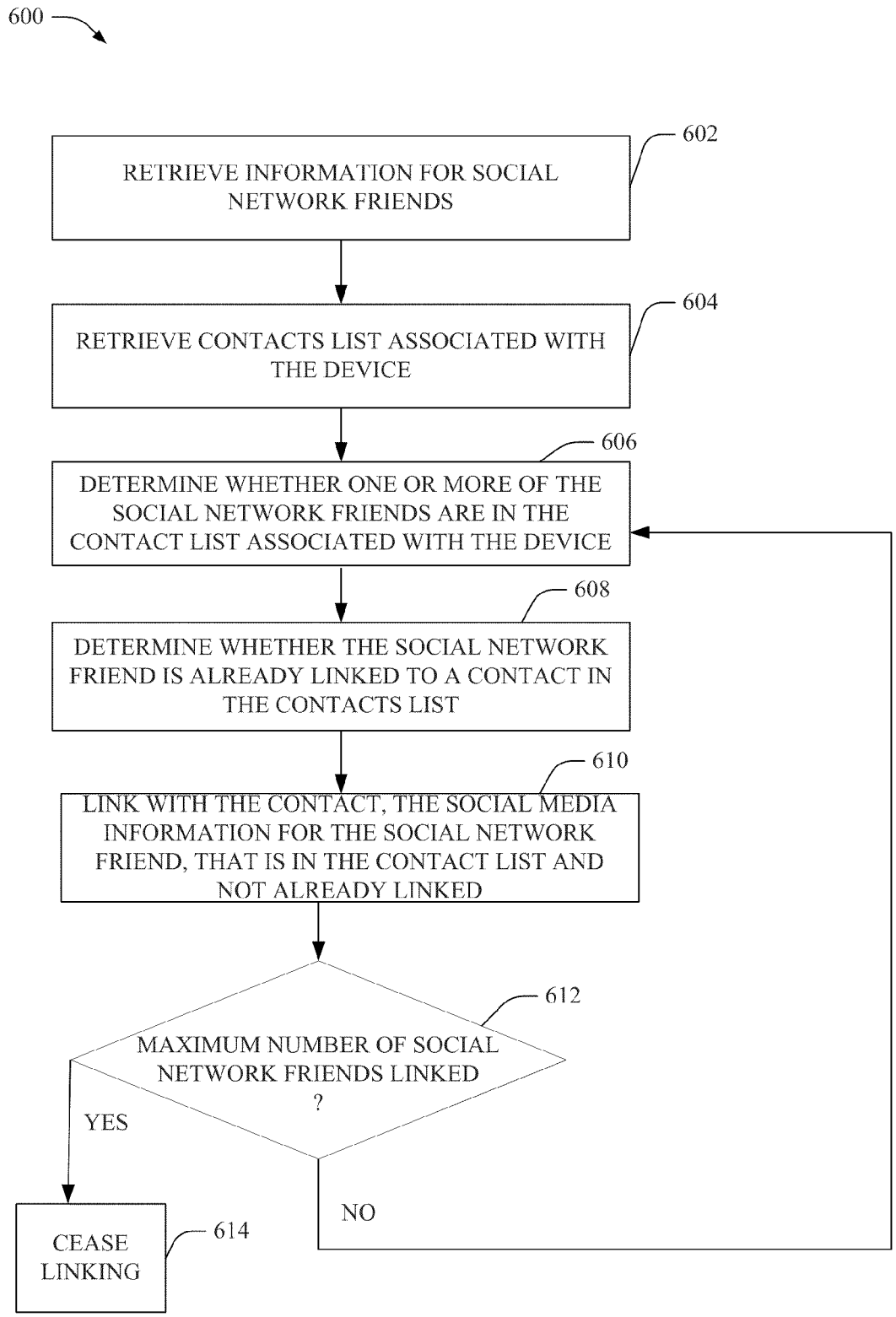

FIG. 6 is yet another method for facilitating linking between contacts and SM information. At 602, method 600 can include retrieving information for a SN contact. At 604, method 600 can include retrieving a contacts list stored on or accessible by the communication device.

At 606, method 600 can include determining whether one or more SN contacts are in the contacts list. At 608, method 600 can include determining whether the SN contact is already linked to a contact in the contacts list.

At 610, method 600 can include linking with the contact, the SM information for the SN contact that is in the contact list and not already linked.

In some embodiments, for each SN contact entry in the SN contacts list, if the SN contact is already linked, the link is maintained. If the SN contact's first name and last name are the same as for another SN contact in the SN contact's list, the SN contact entry in the SN contacts list is skipped and the SN contact is not linked. If the SN contact's first name and last name has an exact unique match with an unlinked contact on the communication device, the contact on the communication device is linked with the SN contact and the corresponding SM information for the SN contact is obtained by the communication device.

At 612, method 600 can include determining whether the maximum number of SN contacts have been linked. In some embodiments, 200 SN contacts and/or 600 contacts can be reviewed for batch linking during a single batch linking process.

At 614, method 600 can cease linking if the maximum number of SN contacts have been linked. If the maximum number have not been linked, the method can return to 606 and determine whether one or more SN contacts are in the contact list associated with the communication device.

Figure 7:
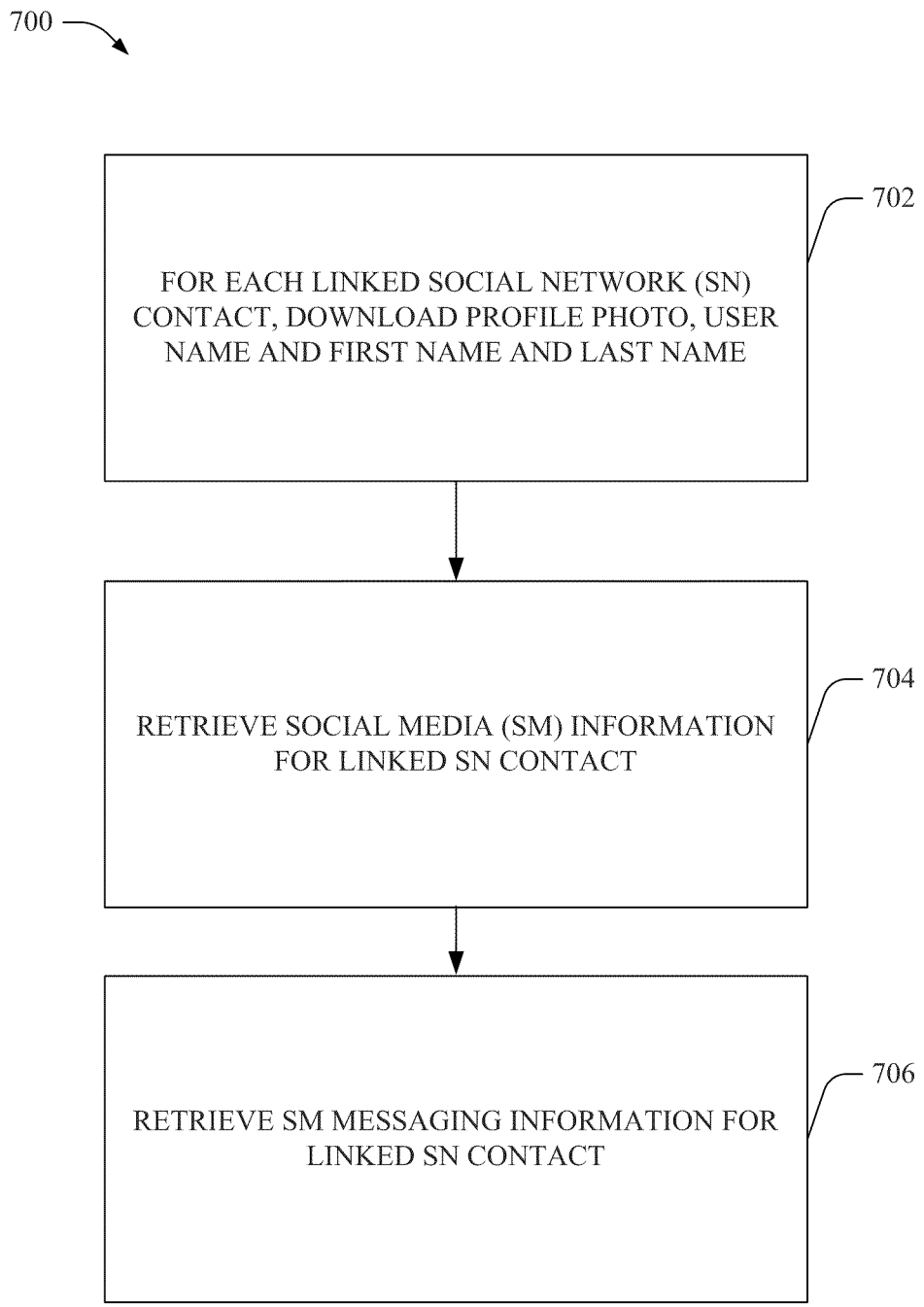

FIG. 7 is another method for facilitating linking between contacts and SN contacts. At 702, method 700 can include downloading from a SNS, profile photo, username, first name and/or last name for a SN contact linked with a contact. In various embodiments, if the SN contact has an empty avatar, the empty avatar is not downloaded.

The information downloaded from the SNS can be for access by the contacts application. Step 702 can be performed for each linked SN contact.

In some embodiments, downloading profile photos can include providing photos missing from the contacts profile information. Subsequently linked SNs then fill in remaining empty contact photos and/or overwrite exiting contact photos from SNs. New feed items from a user and new profile photos can be detected and downloaded and stored upon subsequent logins to the SNS by the user of the communication device. In various embodiments, feed items can include, but are not limited to, status information, alerts, SNS friend activity information, comments and invitations from SNS friends.

At 704, method 700 can include retrieving SM information for linked SN contacts. In some embodiments, the SM information can be retrieved for access by a SM application of the SM management component 204 (with reference to FIG. 2).

At 706, method 700 can include retrieving SM messaging information for a linked SN contact. In some embodiment, the SM messaging information can be for access by conversations application of the messaging component 220.

Figure 8:
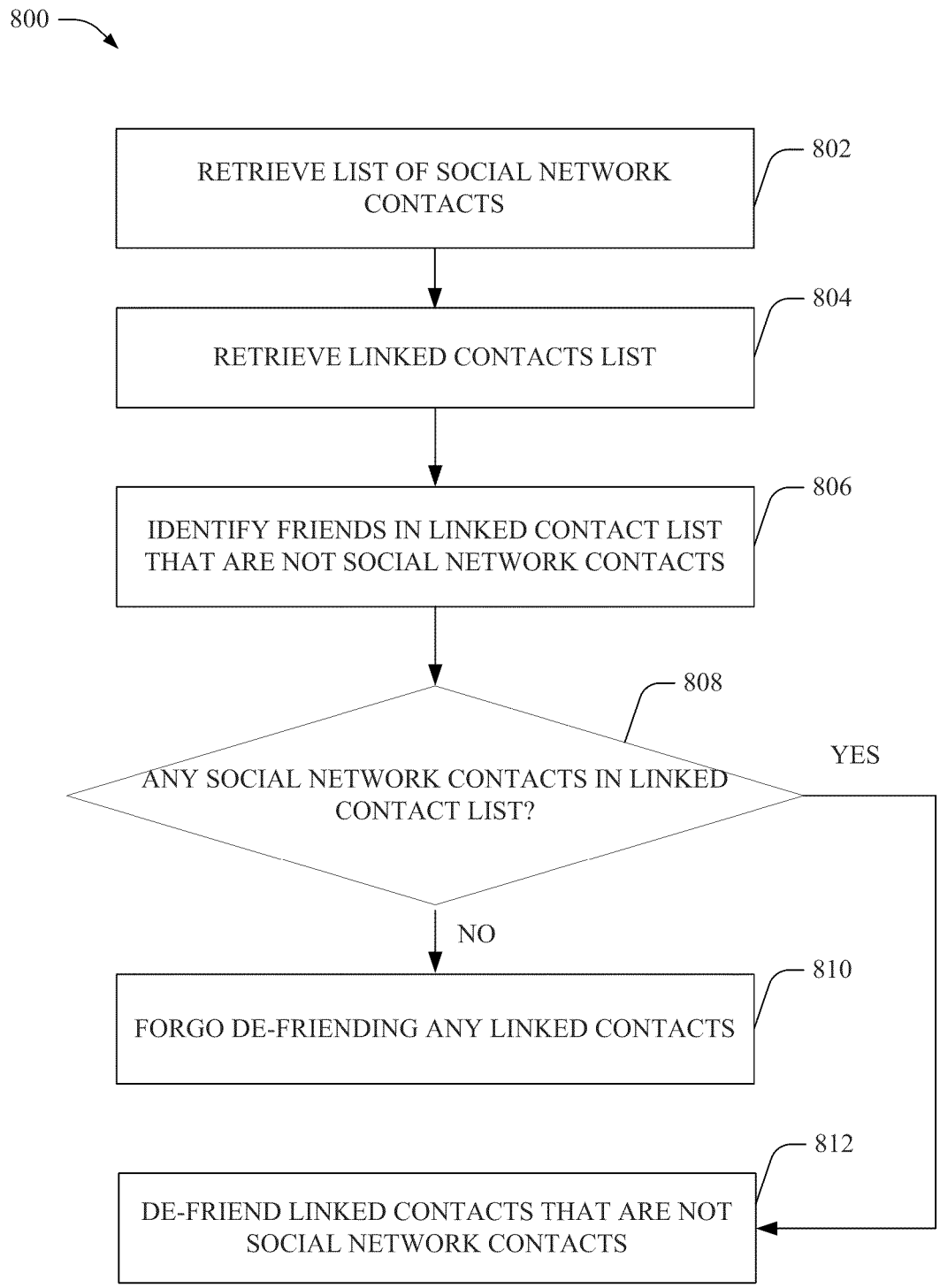

FIG. 8 is yet another method for facilitating linking between contacts and SN contacts. At 802, method 800 can include retrieving a list of SN contacts. The list can include a maximum number of SN contacts, with the maximum number being configurable. If the user has more SN contacts than can be retrieved, a message or alert can be output from the communication device informing the user of such.

At 804, method 800 can include retrieving a linked contacts list. The linked contacts list can be retrieved from a database with which the communication device is in communication in some embodiments.

At 806, method 800 can include identifying SN contacts in the linked contact list that are not SN contacts. At 808, method 800 can include determining whether any SN contacts are in the linked contacts list.

If no SN contacts are in the linked contacts list, at 810, method 800 can include not de-friending any linked contacts.

If any SN contacts are in the linked contacts list, at 812, method 800 can include de-friending the linked contacts that are not SN contacts. De-friending the contact can include removing the link between the SN contact and the contact. In various embodiments, when a SN contact leaves the SN, de-friends the user and/or is de-linked from a contact, the contact photo downloaded from the SN for the SN contact can be removed upon detection of the de-friending or upon the de-linking. Additionally, if a user deletes a SN, the photos for the SN are deleted from contacts.

These embodiments enable batch or automatic de-friending. However, as shown in FIG. 18, the UI can display a screen enabling the user to manually de-friend or de-link a SN contact from the contact. The information for the SN contact is then associated with the unlinked card and/or the unlinked SN contacts.

The method 800 can continue at step 606 of FIG. 6 in some embodiments.

Figure 9:
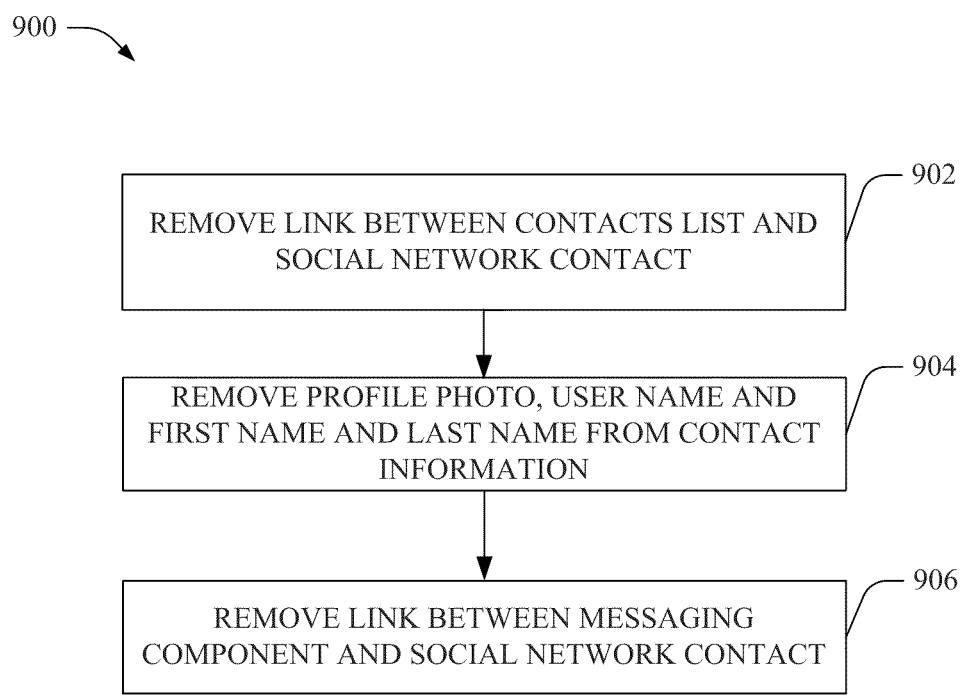

FIG. 9 is yet another method for facilitating de-linking between contacts and SN contacts. At 902, method 900 can include removing link between the contacts list and the SN contact. At 904, method 900 can include removing the profile photo, username, first name and last name from contact information.

At 906, method 900 can include removing the link between the messaging component and the SN contact.

Figure 10:
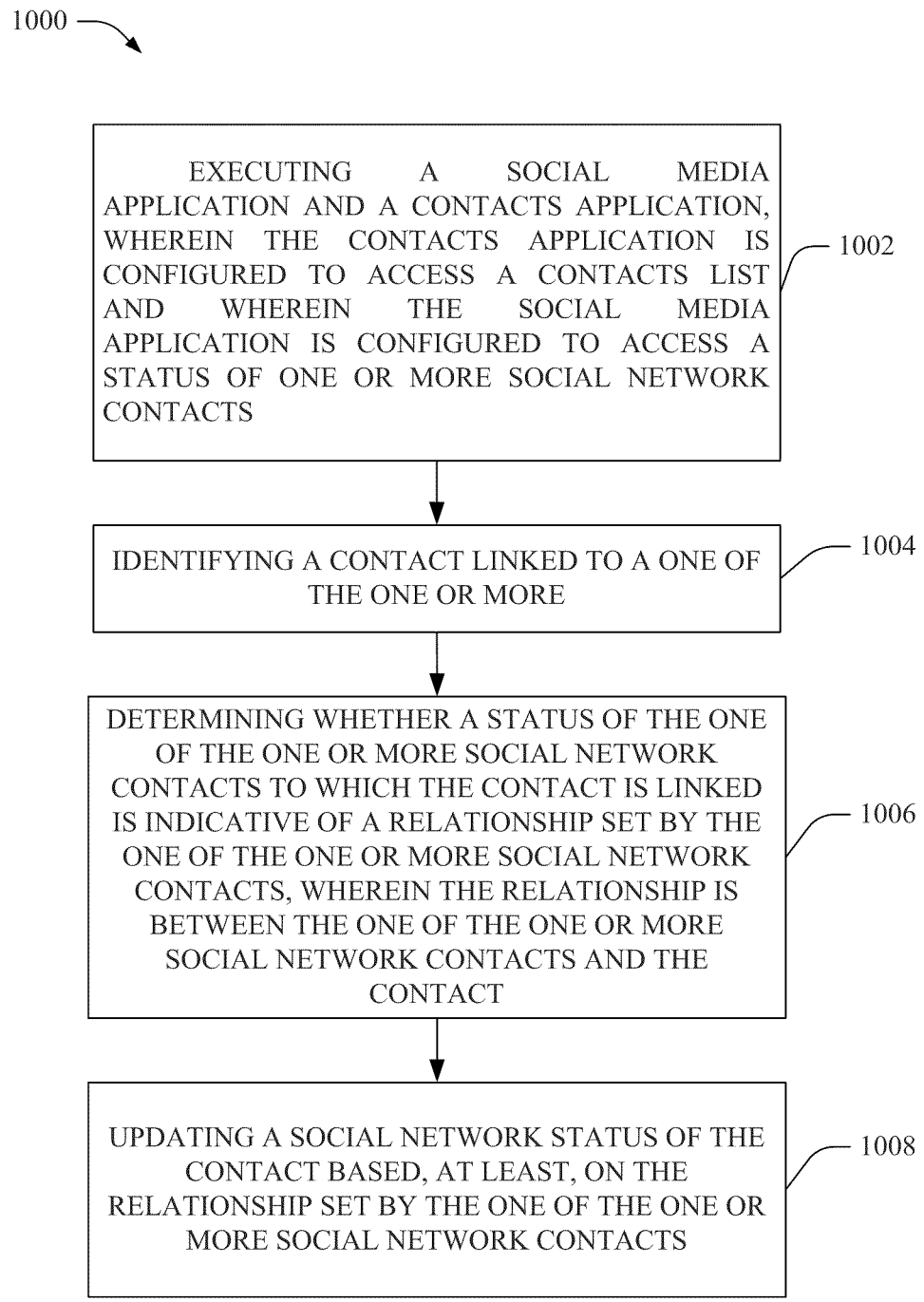

FIG. 10 is another method for facilitating linking between contacts and SM is provided. At 1002, the method 1000 can include executing an application. In some embodiments, the application includes a SM application and a contacts application. The contacts application can be configured to access a contacts list and the SM application can be configured to access a status of one or more SN contacts.

At 1004, method 1000 can include identifying a contact linked to a one of the one or more SN contacts, wherein the contacts list comprises the contact.

At 1006, method 1000 can include determining whether a status of the one of the one or more SN contacts to which the contact is linked is indicative of a relationship set by the one of the one or more SN contacts, wherein the relationship is between the one of the one or more SN contacts and the contact.

At 1008, method 1000 can include updating a SN status of the contact based, at least, on the relationship set by the one of the one or more SN contacts. In some embodiments, updating comprises de-friending the one of the one or more SN contacts based, at least, on determining that the relationship set by the one of the one or more SN contacts is indicative of a lack of a SN contact relationship between the contact and the one of the one or more SN contacts.

Figure 11:
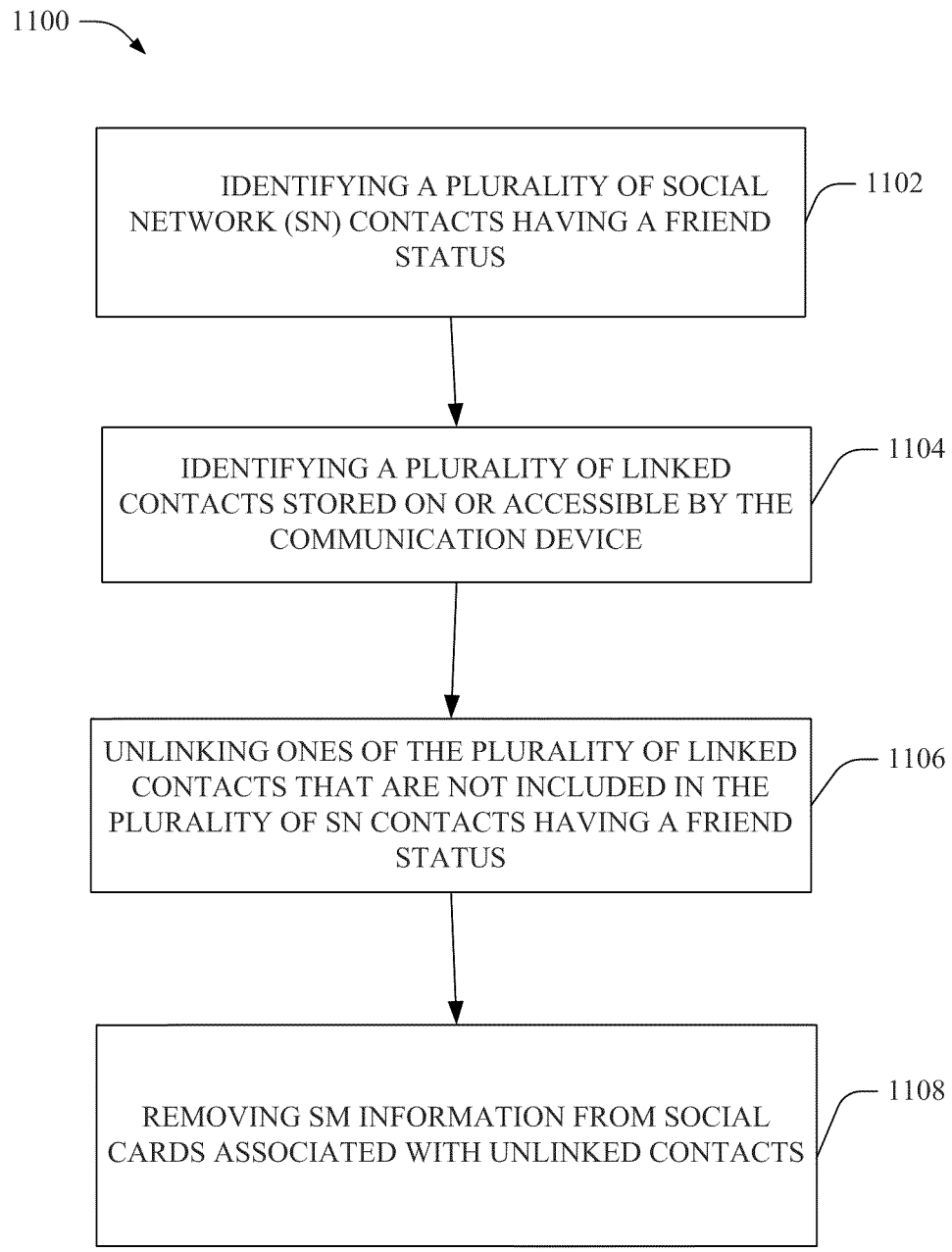

FIG. 11 is yet another method facilitating SM management. At 1102, method 1100 can include identifying a plurality of SN contacts having a friend status. At 1104, method 1100 can include identifying a plurality of linked contacts stored on or accessible by the communication device.

At 1106, method 1100 can include unlinking ones of the plurality of linked contacts that are not included in the plurality of SN contacts having a friend status.

At 1108, method 1100 can also include removing SM information from social cards associated with unlinked contacts. The SM information can include at least one of a SNS profile photo, a SNS username, a first or last name associated with a SN, a SNS website posting, a SNS status update, one or more SNS feeds.

In some embodiments, method 1100 can also include additional steps not shown. These steps can include identifying a plurality of unlinked contacts; linking unlinked ones of the plurality of SN contacts having a friend status with ones of the plurality of unlinked contacts based, at least, on determining that the unlinked ones of the plurality of SN contacts are not duplicates of other ones of the plurality of SN contacts and matching information of the unlinked ones of the plurality of SN contacts with information of ones of the plurality of unlinked contacts; and maintaining links existing between linked ones of the plurality of SN contacts having the friend status and ones of the plurality of linked contacts.

Referring back to FIG. 3, manual linking can also be provided via the manual linking component 302 of the SM management component 304. In various embodiments, manual linking of contacts and SN contacts can be as follows.

The communication device 201 can output a display region illustrating SN contacts for one or more SNSs with which the user of the communication device 201 is affiliated. In some embodiments, SN contacts can be displayed based on text entered into the UI of the communication device 201 indicating a name of a SN contact (or a portion of a name).

In some embodiments, the UI component 202 can control the UI to display information inquiring about whether a contact on the communication device's social contacts card is a SN contact on a SN network with which the user is affiliated. The UI can display a button or icon that can be activated, or text box into which text can be entered, to provide an entry indicating whether the contact on the communication device's contacts card is a SN contact on a SN network with which the user is affiliated. As such, selection of one or more of the SN contacts can be received via an input to the communication device 201.

The manual linking component 304 can search for a corresponding contact to the SN contact selected. Upon locating a corresponding contact, the manual linking component 304 can link the SM information for the selected SN contact with the corresponding contact.

In various embodiments, the manual linking component 304 can receive inputs for overwriting preexisting links and replacing such preexisting links with new links to different contacts and/or linking more than one SN contact to a contact. The manual linking component 304 can also receive an input to create a link and can determine whether a link is already created between the SN contact and the contact.

In some embodiments, manual linking can be initiated at a display region of the UI at which the communication device is displaying a list of contacts. The user can manually select the contacts and the communication device can link the contact to the SN contact. In some embodiments, the communication device can determine whether the contact is already linked to a SN contact prior to performing the linking. If the contact is already linked to a SN contact, the communication device 201 can notify the user and await an entry by the user as to whether the user would like to replace the previously existing link with the current link, thereby removing the existing link from the contact and linking the contact to the SN contact currently indicated.

As such, the embodiments described herein enable selection of SN contacts and creation of links between the SN contact and an existing contact stored on or accessible by the communication device 201.

Upon batch or manual linking the contacts and SM information, the two types of information can be integrated and displayed in the triptych UI for a designated contact, as described in FIG. 7 and in U.S. Non-Provisional patent application Ser. No. 12/643,726, filed Dec. 21, 2009, titled "SYSTEMS, APPARATUS, METHODS AND COMPUTER-READABLE STORAGE MEDIA FOR FACILITATING INTEGRATED MESSAGING, CONTACTS AND SOCIAL MEDIA FOR A SELECTED ENTITY" which is incorporated herein by reference in its entirety.

The communication device 201 can also include a SM component 212. The SM component 212 can work in conjunction with the SM management component in some embodiments. In other embodiments, the communication device 201 need not include a separate SM component 212 and the one or more functions of the SM component 212 can be included in the functionality of the SM management component 204.

As such, in various embodiments, the SM component and/or the SM management component can be configured to control the receipt, aggregation, generation, output and/or filtering of SM information at the communication device 201. By way of example, but not limitation, SM information can include, but is not limited to, information associated with or output from SM feeds, blog information, chat information, text messaging information, instant messaging information, and the like. The SM information can be displayed in any number of arrangements including, but not limited to, the subject matter of the SM feed, the SNS from which the social media feed is provided and/or the chronological order of the SM feeds. In some embodiments, the SM information can include comments posted (or a number of comments posted) in association with one or more social media feeds for the individual. In some embodiments, one or more comments can be shown on the UI with the one or more feeds. SM applications can include applications that provide SM feeds, news feeds and wall postings from FACEBOOK®, activity updates (e.g., tweets) from TWITTER® or other information from SNSs such as MYSPACE®, sites of interest and the like.

In various embodiments as described herein and with reference to any number of different applications including, but not limited to, a messaging application, a contacts application and/or a SM application, where an entity, person or individual is discussed, the entity, person or individual can be a legal or natural entity, person or individual. Similarly, in various embodiments as described herein and with reference to any number of different applications including, but not limited to, a messaging application, a contacts application and/or a SM application, where an entity or group is discussed herein, the entity or group can include one or more legal or natural entities, persons or individuals. By way of example, but not limitation, an entity or group could be an organization, a business entity, a group of humans, and/or a group including a legal and a natural person or entity.

The communication device 201 can also include an application integration component (AIC) (not shown). In some embodiments, the AIC can include software and/or hardware configured to integrate one or more applications at an individual level or at a group level. Integrating one or more applications at an individual level can include retrieving and/or providing information specific to an individual. Integrating one or more applications at a group-level can include retrieving and/or providing information specific to a group or individuals of, or members of, the group. For example, the AIC can provide messaging, contacts and/or social media information about a specific individual or for a specific group or for specific members of a group.

In these embodiments, the AIC can enable the communication device 201 to be individual-targeted or group-targeted in provisioning of contact, messaging and/or SM information without requiring a user of the communication device 201 to enter individual applications for each of the contact, messaging and/or SM information.

As such, while the messaging component 218, contacts component 210 and the SM component 212 can allow the user of the communication device 201 to view messaging, contacts and SM information about one or more individuals or groups on a single display region of the UI, when the AIC integrates the messaging, contacts and/or SM application, the AIC can do such integration at an individual or group level. As such, upon integration, the messaging, contacts and/or SM information can be targeted towards a single individual and/or a single group. The targeted information can be information that displays details specific to or about the individual and/or group. Such targeted information can be displayed by UI.

The communication device 201 can also include a messaging component 220 configured to create, transmit and/or receive messages, SM information and/or initiate or receive calls. The messages can include, but are not limited to, SMS messages, MMS messages, instant messages, email messages or the like. The calls can include, but are not limited to, telephone calls received from a PSTN, VoIP calls, video and the like.

The communication device 201 can also include a processor 206 configured to execute computer-executable instructions to perform one or more of the functions described herein, and the communication device 201 can include the memory 208 for storing the computer-executable instructions and/or information for performing the operations described herein. The communication device 201 can also include the UI 202 configured to provide the displays of information from the communication device 201 as described herein. The communication device 201 can also include an I/O component 222 to receive information to and output information from the communication device 201.

The communication device 201 can include a memory 208 and data store component 224. The memory 208 and/or data store component 224 can store information and/or settings and/or computer-executable instructions for performing one or more functions described herein for the communication device 201. In various embodiments, as described below with reference to method 400 of FIG. 4, for example, the data store component 224 can store information including, but not limited to, contacts information, SM information, information indicative of whether or not a contact (or SN contact) is linked or unlinked, SM information, settings for performing batch linking (e.g., a maximum number of SN contacts that can be linked during a single batch linking process) and the like.

In various embodiments, the data store component 224 can store data structures (e.g., user data, application data, metadata); code structure(s) (e.g., modules, objects, classes, procedures) or instructions; message hashes; neighbor cell list; information relating to securing the communication device 201 and information associated therewith, displaying information in the UI display screen, generating or displaying an overlay display region, generating or processing notifications and associated notification-related information; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor 206 can be functionally coupled (e.g., through a memory bus) to the data store component 224 in order to store and retrieve information (e.g., neighbor cell list; information relating to securing the communication device 201 and information associated therewith, displaying information in the UI display screen, generating or displaying an overlay display region, generating or processing notifications and associated notification-related information; frequency offsets; desired algorithms; etc.) desired to operate and/or confer functionality, at least in part, to, SM management component 204, UI component 202, and/or other operational aspects or components of the communication device 201.

One or more databases (or data store components 224) can be included in, or accessible by, system 200, although not shown. The databases can be store information including, but not limited to, information about: user of the communication device, static information (e.g., unique identification) for the SNSs 232, 234, 236, authentication and state information for the SNSs 232, 234, 236, linking information between the contacts for the communication device 201 and SN contacts, each linked SM card, each unlinked SM card, unique contact identification for the linked contact, SNS ID of a linked SN contact, SNS user ID signed into the SN, user ID for a linked SN contact, username for a linked SN contact, avatar URL for a linked SN contact, primary key to retrieve feed items for a specific SN and user, unique ID for each SNS, SNS login (e.g., email) for the user that is signed in, URL for the avatar for the SN user that is signed in, a flag to indicate if batch linking was successfully completed after adding a SN, a flag to indicate if avatar photos for all batch-linked SN contacts were successfully downloaded after adding a SN, timestamp the user last viewed the SN feed on the communication device 201, display text for a feed item, thumbnails for photo album feed items, author information for individual feed items, photo albums and/or each photo in the photo album. The databases can also store SM information and contacts information.

While the embodiments described herein are described with reference to a combination of two or more components, in various embodiments, one or more of the functions or structure (or part thereof) associated with the two or more components of the communication devices 102, 200 can be performed or provided in the SM management component 204, respectively. Additionally, steps associated with various methods described herein that can be described with reference to different components or applications can be performed by a single component or application. Finally, multiple steps can be combined and performed in a single step, single steps can be performed as multiple steps, and steps described as being performed in sequence or parallel can be performed partly or completely in parallel or sequence, respectively.

Figure 19:
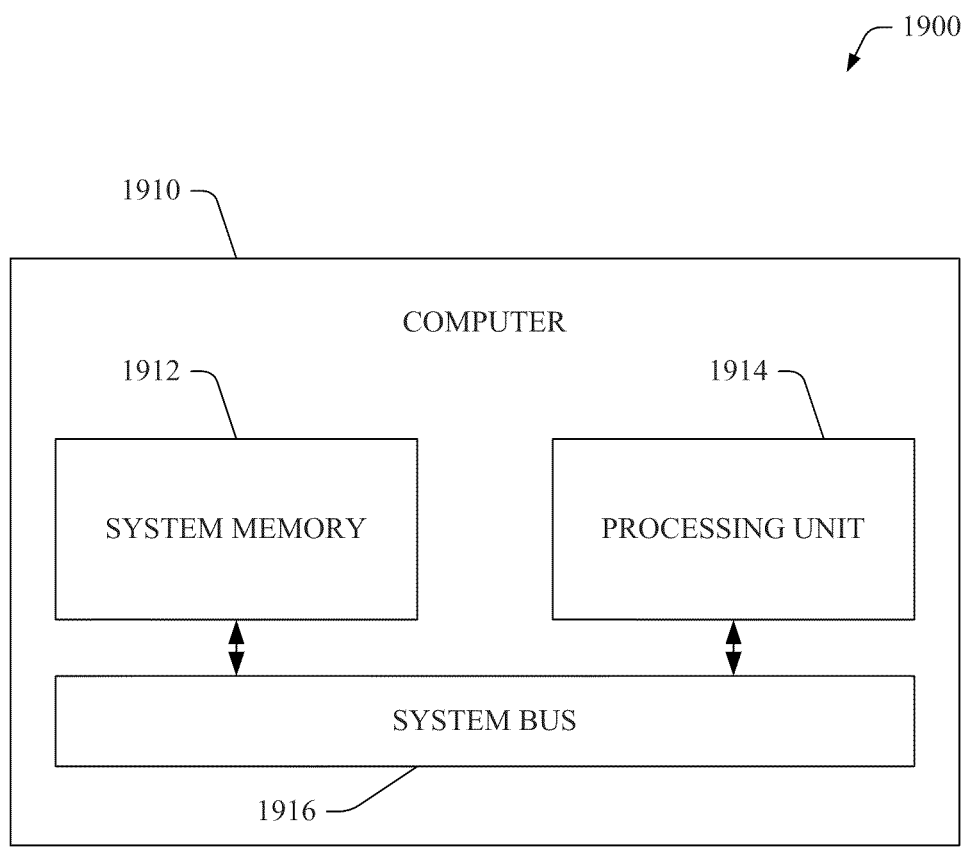
FIG. 19 illustrates an exemplary operating environment that facilitates the systems, apparatus, methods and computer-readable storage media described herein.

FIG. 19 illustrates an exemplary operating environment that facilitates the systems, apparatus and methods described herein. In order to provide additional context for various aspects of the embodiments described herein, FIG. 19 and the following discussion are intended to provide a brief, general description of a computing environment 1900 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available media that can be accessed by a computing device and includes both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read-only memory (ROM), random access memory (RAM), Electrically Erasable Programmable Read-Only Memory (EEPROM), flash memory or other memory technology, compact disc read-only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communication media can embody computer-readable instructions, data structures, program modules and/or other structured or unstructured data in a data signal such as a modulated data signal, e.g., a carrier wave or other transport mechanism, and includes any information delivery or transport media. The term "modulated data signal" or "modulated data signals" refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media. Combinations of any of the above can also be included within the scope of communication media. In some embodiments, communication media are capable of subsequently propagating through electrically conductive media, (e.g., such as a system bus, microprocessor, data port, and the like) and/or non-electrically conductive media (e.g., in the form of radio frequency microwave frequency, optical frequency and similar electromagnetic frequency modulated data signals).

In accordance with various aspects, the computing environment 1900 for implementing various aspects includes a computer 1910, the computer 1910 including a processing unit 1914, a system memory 1912 and a system bus 1916. The system bus 1916 couples system components including, but not limited to, the system memory 1912 to the processing unit 1914. The processing unit 1914 can be any of various commercially available processors, such a single core processor, a multi-core processor, or any other suitable arrangement of processors. The system bus 1916 can be any of several types of bus structure that can further interconnect to a memory bus (with or without a memory controller), a peripheral bus, and a local bus using any of a variety of commercially available bus architectures. The system memory 1912 can include ROM, random access memory RAM, high-speed RAM (such as static RAM), erasable programmable read only memory (EPROM), EEPROM, flash memory, and/or the like. Additionally or alternatively, the computer 1902 can include a hard disk drive, upon which program instructions, data, and the like can be retained. Moreover, removable data storage can be associated with the computer 1910. Hard disk drives, removable media, computer-readable storage media, etc. can be communicatively coupled to the processing unit 1914 by way of the system bus 1916.

The system memory 1912 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1910 through one or more wired/wireless input devices, such as a keyboard, pointing and clicking mechanism, pressure sensitive screen, microphone, joystick, stylus pen, etc. A monitor or other type of interface can also be connected to the system bus 1916.

The computer 1910 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1910 can connect to other devices/networks by way of antenna, port, network interface adaptor, wireless access point, modem, and/or the like.

The computer 1910 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and BLUETOOTH® wireless technologies. Thus, the communication can be a predefined structure as with a conventional network or simply an ad hoc communication between at least two devices.

WiFi allows connection to the Internet from a desired location (e.g., couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11(a, b, g, etc.) to provide secure, reliable, fast wireless connectivity. A WiFi network can be used to connect communication devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 20:
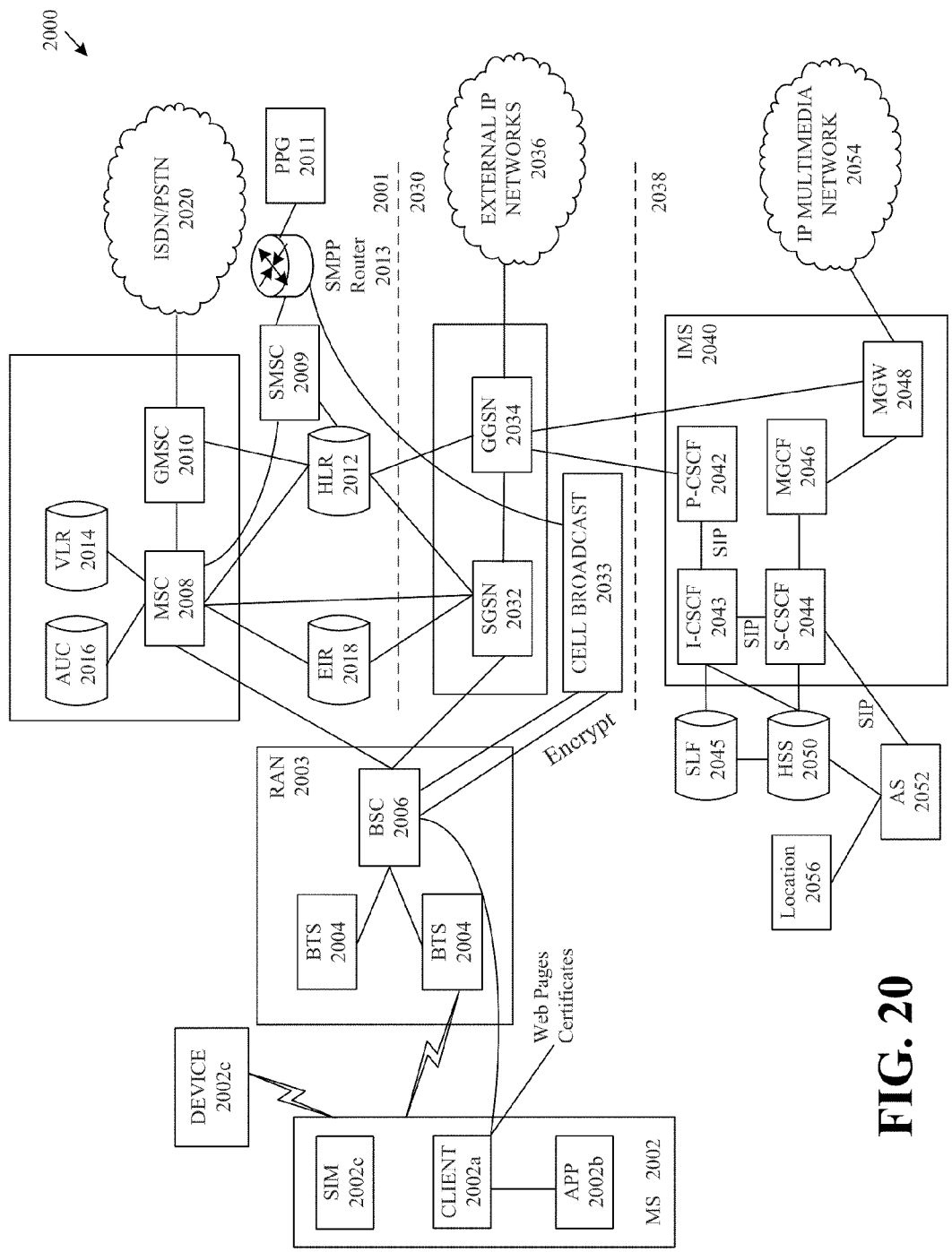
FIG. 20 illustrates an exemplary network environment that facilitates the systems, apparatus, methods and computer-readable storage media described herein.

FIG. 20 illustrates an exemplary network environment that facilitates the systems, apparatus and methods described herein. FIG. 20 depicts a GSM/General packet radio service (GPRS)/IP multimedia network architecture 2000 that includes a GSM core network 2001, a GPRS network 2030 and an IP multimedia network 2038. The GSM core network 2001 includes a Mobile Station (MS) 2002, at least one Base Transceiver Station (BTS) 2004 and a Base Station Controller (BSC) 2006. The MS 2002 is physical equipment or Mobile Equipment (ME), such as a mobile phone or a laptop computer that is used by mobile subscribers, with an Subscriber identity Module (SIM) 2002*c*. The SIM 2002*c* includes an International Mobile Subscriber Identity (IMSI), which is a unique device identifier of a subscriber. The MS 2002 includes an embedded client 2002*a* that receives and processes messages received by the MS 2002. The embedded client 2002*a* can be implemented in JAVA and is discuss more fully below.

The embedded client 2002*a* communicates with an application (APP) 2002*b* that provides services and/or information to an end user. One example of the application can be navigation software that provides near real-time traffic information that is received via the embedded client 2002*a* to the end user. The navigation software can provide road conditions, suggest alternate routes, etc., based at least in part on the location of the MS 2002. Those of ordinary skill in the art understand that there are many different methods and systems of locating an MS 2002.

Alternatively, the MS 2002 and a device 2002c can be enabled to communicate via a short-range wireless communication link, such as BLUETOOTH® technologies. For example, a BLUETOOTH® SIM Access Profile can be provided in an automobile (e.g., device 2002c) that communicates with the SIM 2002c in the MS 2002 to enable the automobile's communications system to pull information from the MS 2002. The BLUETOOTH® communication system in the vehicle becomes an "embedded phone" that employs an antenna associated with the automobile. The result is improved reception of calls made in the vehicle. As one of ordinary skill in the art would recognize, an automobile is one example of the device 2002c. There can be an endless number of devices 2002c that use the SIM within the MS 2002 to provide services, information, data, audio, video, etc. to end users.

The BTS 2004 is physical equipment, such as a radio tower, that enables a radio interface to communicate with the MS. Each BTS can serve more than one MS. The BSC 2006 manages radio resources, including the BTS. The BSC can be connected to several BTSs. The BSC and BTS components, in combination, are generally referred to as a base station (BSS) or radio access network (RAN) 2003.

The GSM core network 2001 also includes a Mobile Switching Center (MSC) 2008, a Gateway Mobile Switching Center (GMSC) 2010, a Home Location Register (HLR) 2020, Visitor Location Register (VLR) 2014, an Authentication Center (AuC) 2018, and an Equipment Identity Register (EIR) 2016. The MSC 2008 performs a switching function for the network. The MSC also performs other functions, such as registration, authentication, location updating, handovers, and call routing. The GMSC 2010 provides a gateway between the GSM network and other networks, such as an Integrated Services Digital Network (ISDN) or Public Switched Telephone Networks (PSTNs) 2020. In other words, the GMSC 2010 provides interworking functionality with external networks.

The HLR 2012 is a database or component(s) that comprises administrative information regarding each subscriber registered in a corresponding GSM network. The HLR 2012 also includes the current location of each MS. The VLR 2014 is a database or component(s) that contains selected administrative information from the HLR 2012. The VLR contains information necessary for call control and provision of subscribed services for each MS currently located in a geographical area controlled by the VLR. The HLR 2012 and the VLR 2014, together with the MSC 2008, provide the call routing and roaming capabilities of GSM. The AuC 2016 provides the parameters needed for authentication and encryption functions. Such parameters allow verification of a subscriber's identity. The EIR 2018 stores security-sensitive information about the mobile equipment.

A Short Message Service Center (SMSC) 2009 allows one-to-one Short Message Service (SMS) messages to be sent to/from the MS 2002. A Push Proxy Gateway (PPG) 2011 is used to "push" (e.g., send without a synchronous request) content to the MS 2002. The PPG 2011 acts as a proxy between wired and wireless networks to facilitate pushing of data to the MS 2002. A Short Message Peer to Peer (SMPP) protocol router 2013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 2002 sends a location update including its current location information to the MSC/VLR, via the BTS 2004 and the BSC 2006. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 2030 is logically implemented on the GSM core network architecture by introducing two packet-switching network nodes, a serving GPRS support node (SGSN) 2032, a cell broadcast and a Gateway GPRS support node (GGSN) 2034. The SGSN 2032 is at the same hierarchical level as the MSC 2008 in the GSM network. The SGSN controls the connection between the GPRS network and the MS 2002. The SGSN also keeps track of individual MS's locations and security functions and access controls.

A Cell Broadcast Center (CBC) 2033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 2034 provides a gateway between the GPRS network and a public packet network (PDN) or other IP networks 2036. In embodiments, the GGSN provides interworking functionality with external networks, and sets up a logical link to the MS through the SGSN. When packet-switched data leaves the GPRS network, it is transferred to an external Transmission Control Protocol (TCP)-IP network 2036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 2030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (e.g., voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vice versa.

The IP multimedia network 2038 was introduced with 3GPP Release 5, and includes an IP multimedia subsystem (IMS) 2040 to provide rich multimedia services to end users. A representative set of the network entities within the IMS 2040 are a call/session control function (CSCF), a media gateway control function (MGCF) 2046, a media gateway (MGW) 2048, and a master subscriber database, called a home subscriber server (HSS) 2050. The HSS 2050 can be common to the GSM network 2001, the GPRS network 2030 as well as the IP multimedia network 2038.

The IP multimedia system 2040 is built around the call/session control function (CSCF), of which there are three types: an interrogating CSCF (I-CSCF) 2043, a proxy CSCF (P-CSCF) 2042, and a serving CSCF (S-CSCF) 2044. The P-CSCF 2042 is the MS's first point of contact with the IMS 2040. The P-CSCF 2042 forwards session initiation protocol (SIP) messages received from the MS to an SIP server in a home network (and vice versa) of the MS. The P-CSCF 2042 can also modify an outgoing request according to a set of rules defined by the network operator (e.g., address analysis and potential modification).

The I-CSCF 2043 forms an entrance to a home network and hides the inner topology of the home network from other networks and provides flexibility for selecting an S-CSCF. The I-CSCF 2043 can contact a subscriber location function (SLF) 2045 to determine which HSS 2050 to use for the particular subscriber, if multiple HSS 2050 are present. The S-CSCF 2044 performs the session control services for the MS 2002. This includes routing originating sessions to external networks and routing terminating sessions to visited networks. The S-CSCF 2044 also decides whether an application server (AS) 2052 is required to receive information on an incoming SIP session request to ensure appropriate service handling. This decision is based on information received from the HSS 2050 (or other sources, such as an application server 2052). The AS 2052 also communicates to a location server 2056 (e.g., a Gateway Mobile Location Center (GMLC)) that provides a position (e.g., latitude/longitude coordinates) of the MS 2002.

The HSS 2050 contains a subscriber profile and keeps track of which core network node is currently handling the subscriber. It also supports subscriber authentication and authorization functions (AAA). In networks with more than one HSS 2050, a subscriber location function provides information on the HSS 2050 that contains the profile of a given subscriber.

The MGCF 2046 provides interworking functionality between SIP session control signaling from the IMS 2040 and ISDN User Part (ISUP)/Bearer Independent Call Control (BICC) call control signaling from the external GSTN networks (not shown). It also controls the media gateway (MGW) 2048 that provides user-plane interworking functionality (e.g., converting between Adaptive Multi-Rate (AMR)- and Pulse-code modulation (PCM)-coded voice). The MGW 2048 also communicates with other IP multimedia networks 2054.

In some embodiments, the IP networks 2036 described herein include networks communicatively coupled to SNSs. As such, the networks disclosed herein can also include such IP networks 2036 and one or more SNSs.

It is to be appreciated and understood that components (e.g., UE, AP, core network, security component, UI, overlay component, etc.), as described with regard to a particular system or methodology, can include the same or similar functionality as respective components (e.g., respectively named components, similarly named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

In the subject specification, terms such as "data store," data storage," "database," "repository", and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include ROM, programmable ROM (PROM), EPROM, EEPROM, phase change memory (PCM), flash memory, or nonvolatile RAM (e.g., ferroelectric RAM (FeRAM)). Volatile memory can include RAM, which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "interface," "module," and the like can refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. As another example, an interface can include input/output (I/O) components as well as associated processor, application and/or API components, and can be as simple as a command line or as complex as an Integrated Development Environment (IDE). Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

Furthermore, the embodiments can or can be implemented as a method, apparatus or article of manufacture using standard programming and/or engineering techniques to produce software, firmware, hardware, or any combination thereof to control a computer, apparatus or article of manufacture to implement the functionality disclosed herein. The term "article of manufacture," as used herein, is intended to encompass a computer program, or computer program product, accessible from any computer-readable device, computer-readable carrier, computer-readable media or computer-readable storage media. Computer-readable storage media can include, but are not limited to, magnetic storage devices (e.g., hard disk, floppy disk, magnetic strip), optical disks (e.g., compact disk (CD), DVD, Blu-ray disc (BD), . . . ), smart cards, and/or flash memory devices (e.g., card, stick, key drive). Additionally it should be appreciated that a carrier wave can carry computer-readable electronic data (e.g., the data transmitted and received via email and/or to access the Internet or a network such as a LAN). As known to those of ordinary skill in the art, modifications can be made to the above embodiments without departing from the spirit of the disclosure.

Moreover, the word "exemplary" is used herein to mean an example, instance or illustration. Any aspect or design described herein as "exemplary" is not to be construed as preferred or advantageous over other aspects or designs. Rather, use of the word "exemplary" is merely intended to present examples of embodiments. Further, as used herein, the term "or" is intended to mean an inclusive "or" rather than an exclusive "or". That is, unless specified otherwise, or clear from context, "X employs A or B" is intended to mean any of the inclusive permutations (e.g., X employs A, X employs B, X employs A and B). In addition, the articles "a" and "an," as used herein, should be construed to mean "one or more" unless, as specified otherwise, or clear from context, the articles are directed to only a singular form.

As used herein, the terms "infer" or "inference" refer generally to the process of reasoning about or inferring states of the system, apparatus, method, environment, and/or user from a set of observations as captured via events and/or data. By way of examples, but not limitation, inference can be employed to identify a specific context or action, or can generate a probability distribution over states. The inference can be probabilistic (e.g., the computation of a probability distribution over states of interest based on a consideration of data and events). Inference can also refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources.

What has been described above includes embodiments of claimed subject matter. It is, of course, not possible to describe every conceivable combination of components or methodologies for purposes of describing the claimed subject matter. However, one of ordinary skill in the art can recognize that many further combinations and permutations of such subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   executing, by a communication device including a processor, a batch linking application;
   in response to the batch linking application being executed, batch linking, by the communication device, a social network contact to a contact of contacts, wherein the contacts are accessible to the communication device, and wherein the batch linking comprises:
      receiving, by the communication device, the social network contact, wherein the social network contact is selected for the batch linking based, at least, on a correspondence to the contact of the contacts;
      removing, by the communication device, a friend status of the social network contact, wherein the removing is based on a status update associated with the social network contact, and wherein the removing comprises removing without intervention by a user of the communication device;
      determining, by the communication device, that the social network contact linked to the contact of the contacts lacks a friend status; and
      in response to the determining, unlinking, by the communication device, the contact of the contacts linked to the social network contact that lacks the friend status, wherein the unlinking comprises unlinking without intervention by the user of the communication device.

2. The method of claim 1, wherein the batch linking comprises:
   batch processing social network contacts, wherein social network contacts comprise the social network contact, and wherein the batch processing comprises:
      comparing the social network contacts to the contacts; and
      selecting as the social network contact, from ones of the social network contacts that correspond to the contacts.

3. The method of claim 2, wherein the selecting as the social network contact comprises:
   comparing information of the social network contact with other information of the contacts; and
   determining the social network contact for which the information of the social network contact matches the other information of the contacts.

4. The method of claim 3, wherein the information of the social network contact and the other information of the contacts comprise a first name and a last name.

5. The method of claim 2, wherein one of contacts is associated with a social card accessible to the communication device, the social card comprises social media information, and the method further comprises:
 associating, with a contact card for the one of the contacts, social media information for the social network contact linked to the contacts.

6. The method of claim 5, wherein the social media information comprises information from a social network with which the social network contact linked to the one of the contacts is affiliated, and the information comprises a social networking site posting.

7. The method of claim 6, further comprising displaying, via a user interface of the communication device, the social card including associated social media information.

8. The method of claim 1, wherein the social network contact is associated with a social networking data service.

9. A method, comprising:
 identifying, by a communication device including a processor, social network contacts having a friend status;
 identifying, by the communication device, linked contacts; and
 deleting, by the communication device, the friend status of the social network contact, wherein the deleting is based on a status update associated with the social network contact, and wherein the deleting comprises deleting without receiving input to perform the deleting by the communication device; and
 unlinking, by the communication device, ones of the linked contacts, wherein the unlinking is performed in response to the social network contact of the social network contacts being determined to lack the friend status.

10. The method of claim 9, further comprising removing, by the communication device, social media information from a social card associated with a contact that has been unlinked by the unlinking.

11. The method of claim 10, wherein the social media information comprises a social networking site website message posting.

12. The method of claim 9, further comprising:
 identifying, by the communication device, unlinked contacts that are unlinked by the unlinking;
 linking, by the communication device, unlinked ones of the social network contacts having a friend status with ones of the unlinked contacts based, at least, on determining that the unlinked ones of the social network contacts are not duplicates of other ones of the social network contacts and matching information of the unlinked ones of the social network contacts with information of ones of the unlinked contacts; and
 maintaining, by the communication device, links existing between linked ones of the social network contacts having the friend status and still linked contacts of the linked contacts.

13. An apparatus, comprising:
 a memory that stores executable instructions; and
 a processor, coupled to the memory, that facilitates execution of the executable instructions to perform operations, comprising:
 selecting a social network contact for a batch linking;
 batch linking the social network contact to a contact accessible to the apparatus in response to acquisition of the social network contact by the apparatus, wherein the social network contact is selected for the batch linking based, at least, on a correspondence to the contact;
 determining whether to perform the batch linking without input external to the apparatus;
 removing a friend status of the social network contact, wherein the removing is based on a status update associated with the social network contact; and
 unlinking a linked contact based on a determination that the social network contact to which the contact is linked is determined to lack a friend status, wherein the unlinking is performed without intervention by a user of the apparatus.

14. The apparatus of claim 13, wherein the operations further comprise:
 batch processing social network contacts, wherein the social network contacts comprise the social network contact, and wherein the batch processing comprises:
 comparing the social network contacts to the contact;
 selecting, as the social network contact of the social network contacts, ones of the social network contacts that correspond to the contact;
 determining whether the social network contact is linked to a corresponding one of contacts; and
 linking the social network contact with the corresponding one of the contacts based, at least, on the social network contact being determined to correspond to the one of the contacts and the social network contact being determined to be unlinked to the corresponding one of the contacts.

15. The apparatus of claim 14, wherein the selecting comprises:
 comparing information of the social network contact with contact information of the contact; and
 determining the social network contact for which the information of the social network contact matches the contact information of the contact.

16. The apparatus of claim 15, wherein the information of the social network contact and the contact information of the contact comprise a telephone number.

17. The apparatus of claim 14, wherein the one of the contacts is associated with a social card accessible by the apparatus, wherein the social card includes social media information, and the operations further comprise:
 associating, with a contact card for the contact, social media information for one of the social network contacts linked to the contact.

18. The apparatus of claim 17, wherein the social media information comprises information from a social network device with which the one of the social network contacts linked to the contact is affiliated, and the information comprises a profile image.

19. The apparatus of claim 17, further comprising a user interface to display the social card including associated social media information.

20. The apparatus of claim 13, wherein the social network contact is associated with a social networking data service.

* * * * *